(12) United States Patent
Nachnolkar et al.

(10) Patent No.: US 11,718,296 B2
(45) Date of Patent: Aug. 8, 2023

(54) USING SHARED TRAFFIC INFORMATION TO SUPPORT ADAPTIVE CRUISE CONTROL (ACC) BETWEEN PLATOONING VEHICLES

(71) Applicant: Bendix Commercial Vehicle Systems LLC, Elyria, OH (US)

(72) Inventors: Rohan N. Nachnolkar, Elyria, OH (US); Phillip J. Kasper, Elyria, OH (US); Nicholas A. Broyles, Elyria, OH (US); Amrut A. Patki, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 293 days.

(21) Appl. No.: 16/707,421

(22) Filed: Dec. 9, 2019

(65) Prior Publication Data

US 2021/0171034 A1 Jun. 10, 2021

(51) Int. Cl.
*B60W 30/165* (2020.01)
*B60W 30/18* (2012.01)
(Continued)

(52) U.S. Cl.
CPC .... *B60W 30/165* (2013.01); *B60W 30/18163* (2013.01); *G05D 1/0289* (2013.01);
(Continued)

(58) Field of Classification Search
CPC .. G08G 1/22; G08G 1/0967; G08G 1/096791; G05D 1/0287; G05D 1/0289; G05D 1/0293; G05D 1/0295; G05D 2201/0213; B60W 30/14; B60W 30/16; B60W 30/165; B60W 30/18163; B60W 2554/40; B60W 2554/402;
(Continued)

(56) References Cited

U.S. PATENT DOCUMENTS 5,483,453 A 1/1996 Uemura et al.
5,781,119 A * 7/1998 Yamashita ............. G05D 1/024
340/905
(Continued)

FOREIGN PATENT DOCUMENTS

CN 103029665 A 4/2013
CN 104890571 A 9/2015
(Continued)

OTHER PUBLICATIONS

Audi, "Audi Q7", 2017.
(Continued)

*Primary Examiner* — Thomas Ingram
(74) *Attorney, Agent, or Firm* — Tucker Ellis LLP

(57) ABSTRACT

Systems and methods are provide for highway vehicle platoon maintenance management. Commercial highway vehicle platoon maintenance management is provided where it is desirable to determine traffic conditions around vehicles of the platoon, to share the determined traffic conditions with the other vehicles of the platoon, and to determine and share adaptive cruise control (ACC) parameters between the platooning vehicles for adjusting platoon inter-vehicle following distances based on the determined traffic conditions.

21 Claims, 17 Drawing Sheets

(51) Int. Cl.
  *G08G 1/00* (2006.01)
  *G08G 1/0967* (2006.01)
  *G05D 1/02* (2020.01)

(52) U.S. Cl.
  CPC ..... *G05D 1/0295* (2013.01); *G08G 1/096791* (2013.01); *G08G 1/22* (2013.01); *B60W 2554/80* (2020.02); *B60W 2556/65* (2020.02); *G05D 2201/0213* (2013.01)

(58) Field of Classification Search
  CPC ....... B60W 2554/80; B60W 2554/801; B60W 2554/803; B60W 2556/65
  See application file for complete search history.

(56) References Cited

U.S. PATENT DOCUMENTS

| | | |
|---|---|---|
| 6,138,062 A | 10/2000 | Usami |
| 6,571,176 B1 | 5/2003 | Shinmura |
| 6,879,901 B2 | 4/2005 | Winner et al. |
| 7,016,783 B2 | 3/2006 | Hac |
| 8,260,498 B2 | 9/2012 | Deng |
| 8,676,443 B2 | 3/2014 | Han |
| 8,838,337 B2 | 9/2014 | Ueda et al. |
| 9,321,460 B2 | 4/2016 | Sasabuchi et al. |
| 9,555,801 B2 | 1/2017 | Yester et al. |
| 9,555,803 B2 | 1/2017 | Pawlicki |
| 10,067,897 B1* | 9/2018 | Lesher ............... G01S 7/4972 |
| 2001/0016798 A1 | 8/2001 | Kodaka et al. |
| 2002/0005778 A1* | 1/2002 | Breed ............... G02B 27/01 340/436 |
| 2003/0014162 A1 | 1/2003 | Sadano |
| 2009/0088925 A1 | 4/2009 | Sugawara et al. |
| 2010/0030430 A1 | 2/2010 | Hayakawa et al. |
| 2010/0194593 A1 | 8/2010 | Mays |
| 2010/0222960 A1 | 9/2010 | Oida et al. |
| 2010/0324823 A1 | 12/2010 | Kobayashi et al. |
| 2011/0082623 A1 | 4/2011 | Lu et al. |
| 2013/0131925 A1 | 5/2013 | Isaji |
| 2015/0146189 A1 | 5/2015 | Kim |
| 2015/0336577 A1 | 11/2015 | Kosaka |
| 2016/0039411 A1 | 2/2016 | Park |
| 2016/0152263 A1 | 6/2016 | Singh |
| 2016/0280264 A1 | 9/2016 | Baek |
| 2016/0339959 A1 | 11/2016 | Lee |
| 2016/0362105 A1 | 12/2016 | Kwon |
| 2017/0061219 A1 | 3/2017 | Shin et al. |
| 2017/0061799 A1 | 3/2017 | Fujii |
| 2017/0080940 A1 | 3/2017 | Ito |
| 2017/0057499 A1 | 5/2017 | Kim |
| 2018/0190119 A1* | 7/2018 | Miller, Jr. ............. G08G 1/166 |
| 2019/0071077 A1* | 3/2019 | Miyamoto ........... B60W 30/16 |
| 2019/0193738 A1* | 6/2019 | Oh ......................... G08G 1/22 |

FOREIGN PATENT DOCUMENTS

| | | |
|---|---|---|
| CN | 103273920 B | 8/2016 |
| CN | 105857315 A | 8/2016 |
| CN | 106004659 A | 10/2016 |
| CN | 106114511 A | 11/2016 |
| DE | 102010050573 A1 | 5/2012 |
| DE | 10337845 A1 | 8/2019 |
| EP | 0738647 A2 | 10/1996 |
| EP | 0913751 B1 | 5/1999 |
| EP | 1527972 B1 | 5/2005 |
| EP | 2149486 A3 | 12/2010 |
| EP | 2244104 A2 | 2/2011 |
| JP | 2004237983 A | 8/2004 |
| JP | 2006315491 A | 11/2006 |
| JP | 2010211504 A | 9/2010 |
| JP | 2010231561 A | 10/2010 |
| JP | 2010280313 A | 12/2010 |
| JP | 2013126823 A | 6/2013 |
| KR | 20160135427 A | 11/2016 |
| WO | 2003047900 A1 | 6/2003 |
| WO | 2009109419 A1 | 9/2009 |
| WO | 2010140215 A1 | 12/2010 |
| WO | 2012091637 A1 | 7/2012 |

OTHER PUBLICATIONS

Rajesh M. Aru et al. "Adaptive Cruise Control for Modern Automobile", THRESHOLD, 2004.

Angelos Amditis et al., "From Interactive to Adaptive: Evolution of Automated Driving", 10th Its European Congress, Helsinki, Finland, Jun. 16-19, 2014.

\* cited by examiner

USING SHARED TRAFFIC INFORMATION TO SUPPORT ADAPTIVE CRUISE CONTROL (ACC) BETWEEN PLATOONING VEHICLES

TECHNICAL FIELD

The embodiments herein relate generally to highway vehicle platoon maintenance management. More specifically, particular embodiments relate to commercial highway vehicle platoon maintenance management where it is desirable to determine traffic conditions around vehicles of the platoon, to share the determined traffic conditions with the other vehicles of the platoon, and to determine and share adaptive cruise control (ACC) parameters between the platooning vehicles for adjusting platoon inter-vehicle following distances based on the determined traffic conditions. Although the embodiments will be described with reference to selected particular examples, it is to be appreciated that the claimed invention is also amenable to other applications and can be equivalently extended to other embodiments and environments.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. Larger platoons can involve many follower vehicles for providing enhanced efficiency, but ensuring the safety of to both the platooned vehicles as well as of the other non-platooning vehicles on the roadway most usually dictate the short single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to non-platooning vehicle traffic conditions near the platoon and to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. On graded roadways, the relatively even distance maintained between the vehicles is often modified to improve or otherwise maintain or enhance the overall safety and efficiency of the platoon. For example, the even distance maintained between the vehicles can be decreased during conditions of the platoon traversing an incline wherein the tendency of the overall platoon is to decrease speed slightly. Conversely, the even distance maintained between the vehicle can be increased during conditions of high non-platoon traffic when sudden deceleration might become necessary and in conditions of the platoon traversing a decline wherein the tendency of the overall platoon is to increase speed slightly. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platooning vehicles follow each other on the roadway in close proximity to each other and often at highway speeds as explained above, and for this they typically use a Radar to control the inter-vehicle distance(s). For the lateral control using automatic steering control, Lane Departure Systems track the lane markings and actively steer the vehicles between the detected lane lines and/or marks. For emergency braking situations such as Autonomous Emergency Braking (AEB) events for example, forward-directed cameras on a following vehicle detect the actuation by a forward vehicle of a rearward facing brake light so that appropriate emergency stopping or other actions can suitably be initiated.

Vehicles that operate on public roadways, however, sometimes encounter conditions that adversely affect the platoon including for example traffic that may be visible to some vehicles of the platoon but not visible to others. For example, a lead vehicle of a platoon might be unaware of a fast approaching vehicle from behind the platoon, while the last vehicle of the platoon could easily recognize this condition. Similarly, non-platooning vehicles alongside the center of the platoon might be viewable by only the mid-platoon vehicles at the center of the platoon while being blocked from view by the leading and trailing vehicles at the front and rear ends of the platoon, respectively.

Given the above, therefore, it would be helpful to provide a system and method for determining travel condition information, such as non-platooning vehicle traffic information for example, by one or more of the platooning vehicles.

It would further be helpful to share the non-platooning vehicle traffic information determined by one or more of the platooning vehicles with other vehicles of the platoon to provide more complete information on conditions of the roadway including the roadway traffic information.

It would also further be helpful to receive and use the shared information such as the traffic condition information to adjust one or more operating conditions or parameters of control of the platoon.

It would further be helpful use the shared traffic condition information to adjust one or more operating conditions or parameters of ACC control of the platoon to ensure that the platooning vehicles remain spaced apart by a safe distance that is adjustable based on the shared traffic condition information.

It would further be helpful use the shared traffic condition information to adjust one or more operating conditions or parameters of Autonomous Emergency Braking (AEB) control of the platoon to ensure that the platooning vehicles can adapt their braking actions to safely reduce their respective speeds that is adjustable based on the shared traffic condition information.

SUMMARY OF THE EXAMPLE EMBODIMENTS

The embodiments herein provide for new and improved systems and methods for determining travel condition information, such as non-platooning vehicle traffic information for example, by one or more of the platooning vehicles.

The embodiments herein further provide for new and improved systems and methods for sharing non-platooning vehicle traffic information determined by one or more platooning vehicles with other vehicles of the platoon to provide more complete information on conditions of the roadway including the roadway traffic information.

The embodiments herein still further provide for new and improved systems and methods for receiving and using shared information such as the traffic condition information to adjust one or more operating conditions or parameters of control of the platoon.

The embodiments herein provide further for new and improved systems and methods for adjusting one or more operating conditions or parameters of ACC control of a platoon to ensure that platooning vehicles remain spaced apart by a safe distance that is adjustable based on the shared traffic condition information.

The embodiments herein provide for new and improved systems and methods for using shared traffic condition information to adjust one or more operating conditions or parameters of Autonomous Emergency Braking (AEB) control of the platoon to ensure that the platooning vehicles can adapt their braking actions to safely reduce their respective speeds that is adjustable based on the shared traffic condition information A system is provided supporting platoon adaptive cruise control between an associated platooning vehicle and a set of at least one other associated platooning vehicle travelling cooperatively as a platoon along an associated roadway. The system of an example includes a platoon control unit configured to be disposed in the associated platooning vehicle, a sensor unit operatively coupled with the platoon control unit, and a communication transmitter operatively coupled with the platoon control unit. The platoon control unit is in operative communication with an associated electronic control unit (ECU) of the associated platooning vehicle, and includes a processor, a non-transient memory device operatively coupled with the processor, and logic stored in the non-transient memory and executable by the processor to support the platoon ACC between the associated platooning vehicle and the set of at least one other associated vehicle travelling as the platoon along the associated roadway. The sensor unit is operable to sense a presence of one or more extra-platoon traffic vehicles relative to the associated platooning vehicle, and selectively generate extra-platoon traffic vehicle data representative of the one or more extra-platoon traffic vehicles being sensed by the sensor unit. The communication transmitter is operable to receive the extra-platoon traffic vehicle data from the platoon control unit, convert the extra-platoon traffic vehicle data into an extra-platoon traffic vehicle signal, and transmit the extra-platoon traffic vehicle signal from the associated following vehicle to the set of at least one other associated platooning vehicle travelling cooperatively as the platoon.

The sensor unit of the system of an example may include a forward distance sensor disposed on a forward-directed end/side of the associated platooning vehicle and operatively coupled with the platoon control unit for sensing a presence of an associated forward vehicle forward of the associated platooning vehicle, a rearward distance sensor disposed on a rearward-directed end/side of the associated platooning vehicle and operatively coupled with the platoon control unit for sensing a presence of an associated forward vehicle travelling behind the associated platooning vehicle.

In a further embodiment the sensor unit of the system may include a Light Detection and Ranging (LIDAR) sensor disposed on the associated platooning vehicle, wherein the LIDAR sensor is configured to sense a presence of one or more extra-platoon traffic vehicles adjacent to corresponding left and/or right lateral sides of the associated platooning vehicle.

In accordance with an aspect a speed sensor is operatively coupled with the platoon control unit and is operable to determine a velocity of the associated platooning vehicle and to generate a speed signal representative of the determined velocity of the associated platooning vehicle. Adaptive cruise control logic stored in the non-transient memory device is executable by the processor to determine, in accordance with the speed signal, the forward distance signal, and the extra-platoon traffic vehicle data: a nominal platooning following distance in accordance with the extra-platoon traffic vehicle data being representative of no extra-platoon traffic vehicles being sensed by the sensor unit or a de-rated nominal platooning following distance in accordance with the extra-platoon traffic vehicle data being representative of one or more extra-platoon traffic vehicles being sensed by the sensor unit.

In the example, the de-rated nominal platooning following distance is less than the nominal platooning following distance in a predetermined proportion based on a level of the extra-platoon traffic vehicles in accordance with the extra-platoon traffic vehicle data. Further, the platoon control unit operates to communicate the nominal platooning following distance or the de-rated nominal platooning following distance to the associated electronic control unit (ECU) of the associated platooning vehicle, for controlling a following distance from the associated platooning vehicle to a vehicle of the set of at least one other associated platooning vehicle ahead of the associated platooning vehicle.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
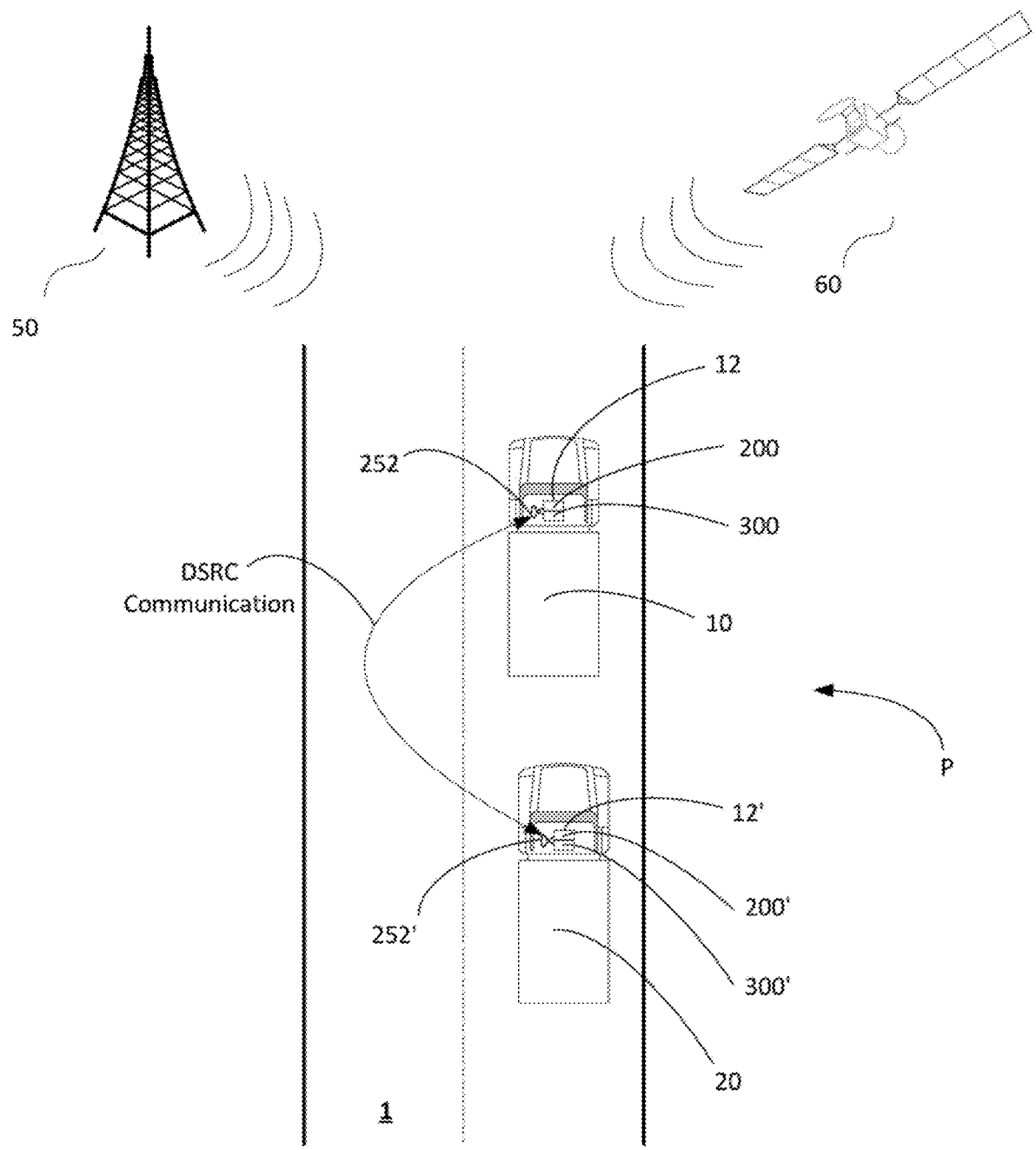
FIG. 1 is a schematic depiction of operation of an exemplary platoon in accordance with the embodiments.

Referring now to the drawings, wherein the showings are for the purpose of illustrating the example embodiments of using non-platooning vehicle traffic data for platoon ACC control only, and not for purposes of limiting the same, FIG. 1 illustrates a basic platoon P including a host or leader vehicle 10 in traffic with a second or follower vehicle 20 in accordance with the present disclosure. As shown, the follower vehicle 20 is traveling proximate to the leader vehicle 10 in an ordered platoon P along a two lane divided roadway 1. The leader vehicle 10 is provided with an electronic control system 12 which includes a data collection and communication module portion 200 and a platooning control portion 300 to be described in greater detail below. Similarly, the follower vehicle 20 is also provided with an electronic control system 12' which includes a data collection and communication module portion 200' and a platooning control portion 300'. In the example embodiments to be described herein, each of the two or more vehicles comprising the various platoons that will be described include the same or equivalent electronic control system 12, the same or equivalent data collection and communication module portion 200, and the same or equivalent platooning control portion 300, although other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to using shared traffic information to support cooperative platoon lane changing by the platooning vehicles, autonomous emergency braking (AEB) among the platooning vehicles, adaptive cruise control (ACC) between the platooning vehicles, inter-vehicle platoon distance and/or spacing management i.e. platoon ordering and spacing, and other coordinated platoon control operations beneficially without the need to consult with or act under the direction of or in concert with the remote wireless communication system 50, the remote satellite system 60, the remote fleet management facility, a Network Operations Center (NOC), a Central Command Center (CCC), or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for self-ordering and spacing into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a dashboard switch, touchscreen interface or the like, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
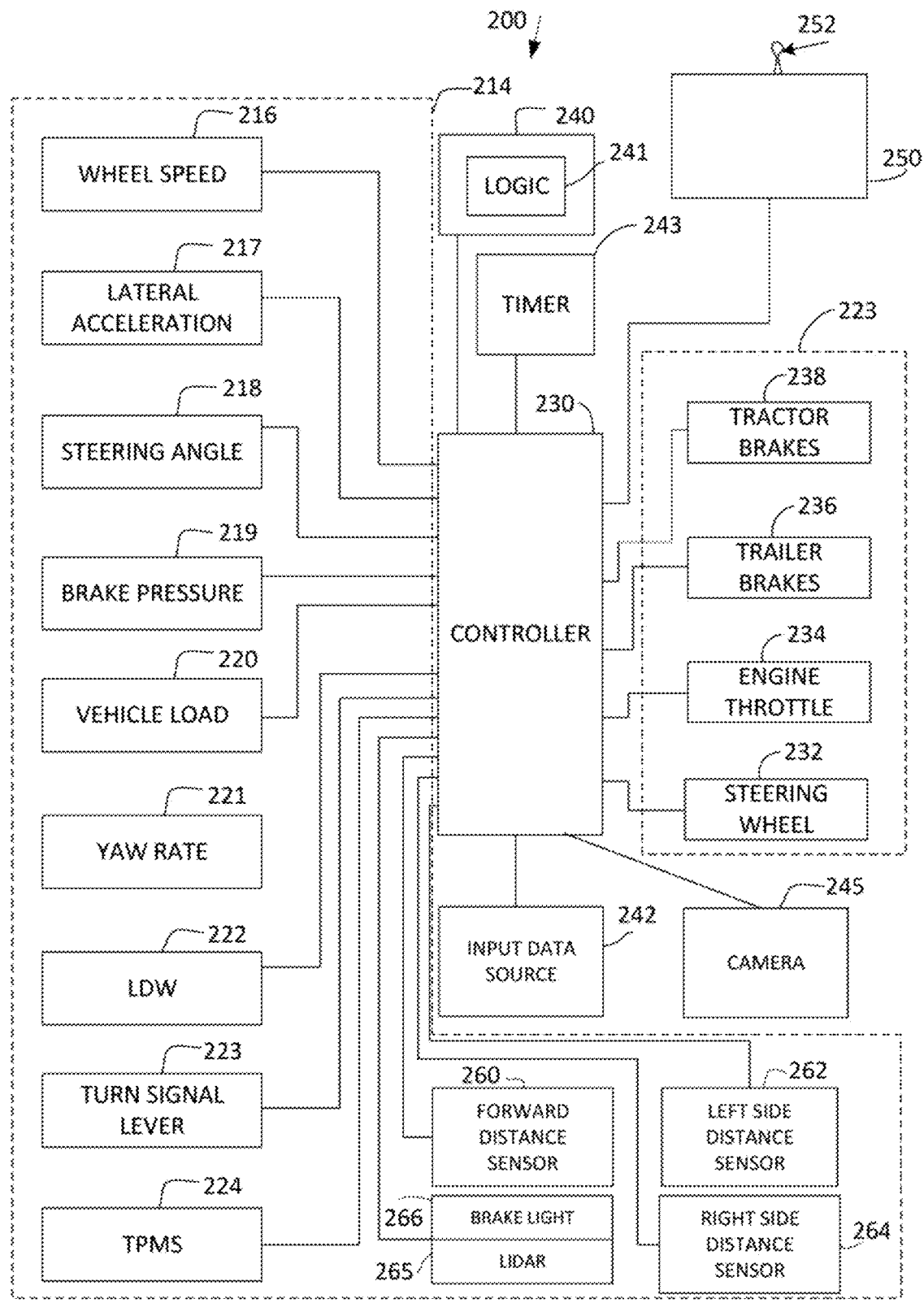
FIG. 2 is a schematic illustration of an exemplary embodiment of a data collection and communication module portion of the subject ACC support system according to the example embodiment.

With reference next to FIG. 2, a schematic representation of a data collection and communication module portion 200 of the subject system for using shared traffic information to support AEB, ACC, and other coordinated platoon control operations between platooning vehicles according to principles of the example embodiment is illustrated. The data collection and communication module 200 may be adapted to detect, monitor, and report a variety of operational parameters and conditions of the commercial vehicle and the driver's interaction therewith, to selectively intervene and take corrective action as may be needed or desired such as, for example, to maintain vehicle stability or to maintain the vehicle following distance relative to other vehicles within a platoon. The data collection and communication module portion 200 of the example embodiment is further adapted to sense a presence of one or more extra-platoon traffic vehicles relative to the vehicle and transmit extra-platoon traffic vehicle information to the other vehicles travelling in the platoon. The data collection and communication module portion 200 of the example embodiment is further also adapted to receive signals and data from communication module portions 200' of one or more other platooning vehicles 20' relating to the sensed presence by the one or more other platooning vehicles 20' of one or more extra-platoon traffic vehicles relative to the one or more other platooning vehicles 20'.

In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, a turn signal sensor 223, and a tire pressure monitoring system (TPMS) 224. The data collection and communication module 200 may also utilize additional devices or sensors in the exemplary embodiment including for example a forward distance sensor 260, a left side distance sensor 262, a right side distance sensor 264, one or more rear lights such as a primary rear brake light 266, and a Light Detection and Ranging (LIDAR) sensor 265. Other sensors and/or actuators or energy generation devices or combinations thereof may be used or otherwise provided as well, and one or more devices or sensors may be combined into a single unit as may be necessary and/or desired.

The data collection and communication module 200 may also include a logic applying arrangement 230, such as a microprocessor or controller, in communication with the one or more devices or systems 214. The controller 230 may include one or more inputs for receiving input data from the devices or systems 214. The controller 230 may be adapted to process the input data, compare the raw or processed input data to one or more stored threshold value(s), transform the input data into one or more other forms for further processing or for vehicle and/or platoon control or for presentation to the vehicle operator, or process the input data using logic executed by to processor of the controller, or the like. The controller 230 may also include one or more outputs for delivering control signals to one or more vehicle systems 223 based on the comparison. The control signals may instruct the systems 223 to intervene in the operation of the vehicle to initiate corrective action, and then report this corrective action to a wireless service (not shown) or simply store the data locally to be used for determining a driver quality. For example, the controller 230 may generate and send a control signal to a steering wheel braking actuator 232 for adding resistance to the ability of the driver operating the vehicle for selectively making turning the vehicle to the left or right harder or easier in accordance with the result of operations performed by turn warning logic based on inputs indicating that traffic may be located in the direction that the driver would like to turn. The controller 230 may generate and send a control signal to an engine electronic control unit or an actuating device to reduce the engine throttle 234 for slowing the vehicle down. Further, the controller 230 may send the control signal to a vehicle brake system 236, 238 to selectively engage the brakes. In a tractor-trailer arrangement, the controller 230 may engage the brakes on one or more wheels of a trailer portion of the vehicle 236 and/or the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The controller 230 may also include a memory portion 240 for storing and accessing system information, and for storing information for effecting the platoon ACC support functionality using traffic information shared between the platooning vehicles such as for example system control logic 241 that is selectively executable by the processor or controller 230 for supporting the use of shared traffic information to support cooperative platoon lane changing by the platooning vehicles, autonomous emergency braking (AEB) among the platooning vehicles, adaptive cruise control (ACC) between the platooning vehicles, inter-vehicle platoon distance and/or spacing management i.e. platoon ordering and spacing, and other coordinated platoon control operations between the platooning vehicle and a set of one or more other vehicle(s) travelling as the platoon (P) along the associated roadway. The memory portion 240 may be separate from the controller 230 as shown or integral with the controller as may be necessary or desired. In addition, it is to be appreciated that the set of devices 214 in the form of various sensors as illustrated and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for and/or as the controller 230 of the example embodiments described herein. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The controller 230 may also include a timer portion 243 operable to time stamp one or more events and/or determine one or more timer intervals between selected one or more events. In the example embodiment, the timer is operable together with other sensor devices to determine a relative speed between the vehicle and one or more other vehicles for control of cooperative platoon lane changing by the platooning vehicles, autonomous emergency braking (AEB) among the platooning vehicles, adaptive cruise control (ACC) between the platooning vehicles, inter-vehicle platoon distance and/or spacing management i.e. platoon ordering and spacing, and other coordinated platoon control operations.

The data collection and communication module 200 may also include a source of input data 242 indicative of a configuration/condition of a commercial vehicle. The controller 230 may sense or estimate the configuration/condition of the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw) and/or the vehicle's braking ability. As an example, in a vehicle with a towed portion, the source of input data 242 may communicate the type of towed portion. In tractor-trailer arrangements, the type of trailer being towed by the tractor may influence the vehicle stability and braking ability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability and/or braking ability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more image capture devices shown in the example embodiment as a single camera 245 representation of one or more physical cameras disposed on the vehicle such as, for example, one camera on each corner of the vehicle. The one or more cameras 245 may be video cameras of the like as may be desired.

Still yet further, the data collection and communication module 200 may also include a transmitter/receiver (transceiver) module 250 such as, for example, a radio frequency (RF) transmitter including one or more antennas 252 for wireless communication of GPS data, one or more various vehicle configuration and/or condition data, and other information for sharing traffic information between platooning vehicles to support ACC according to principles of the example embodiment or for sharing the information with one or more wireless services 50, 60 (FIG. 1) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The controller 230 is operative to communicate the acquired data to the one or more receivers in a raw data form, that is without processing the data, in a processed form such as in a compressed form, in an encrypted form or both as may be necessary or desired. In this regard, the controller 230 may determine extra-platoon traffic data in accordance with signals obtained from the set of sensors 260, 262, 264, 265, and deliver the extra-platoon traffic data to the transmitter/receiver (transceiver) module 250 for communication of the extra-platoon traffic data to the one or more other vehicles of the platoon. The controller may further combine selected ones of the vehicle parameter data values into processed data representative of higher level vehicle condition data such as, for example, data from the lateral acceleration sensor 218 may be combined with the data from the steering angle sensor 220 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, lane departure warning event data, excessive lane departure event data, lane change without turn signal event data, loss of video tracking event data, LDW system disabled event data, Autonomous Emergency Braking (AEB) data, following distance data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 3:
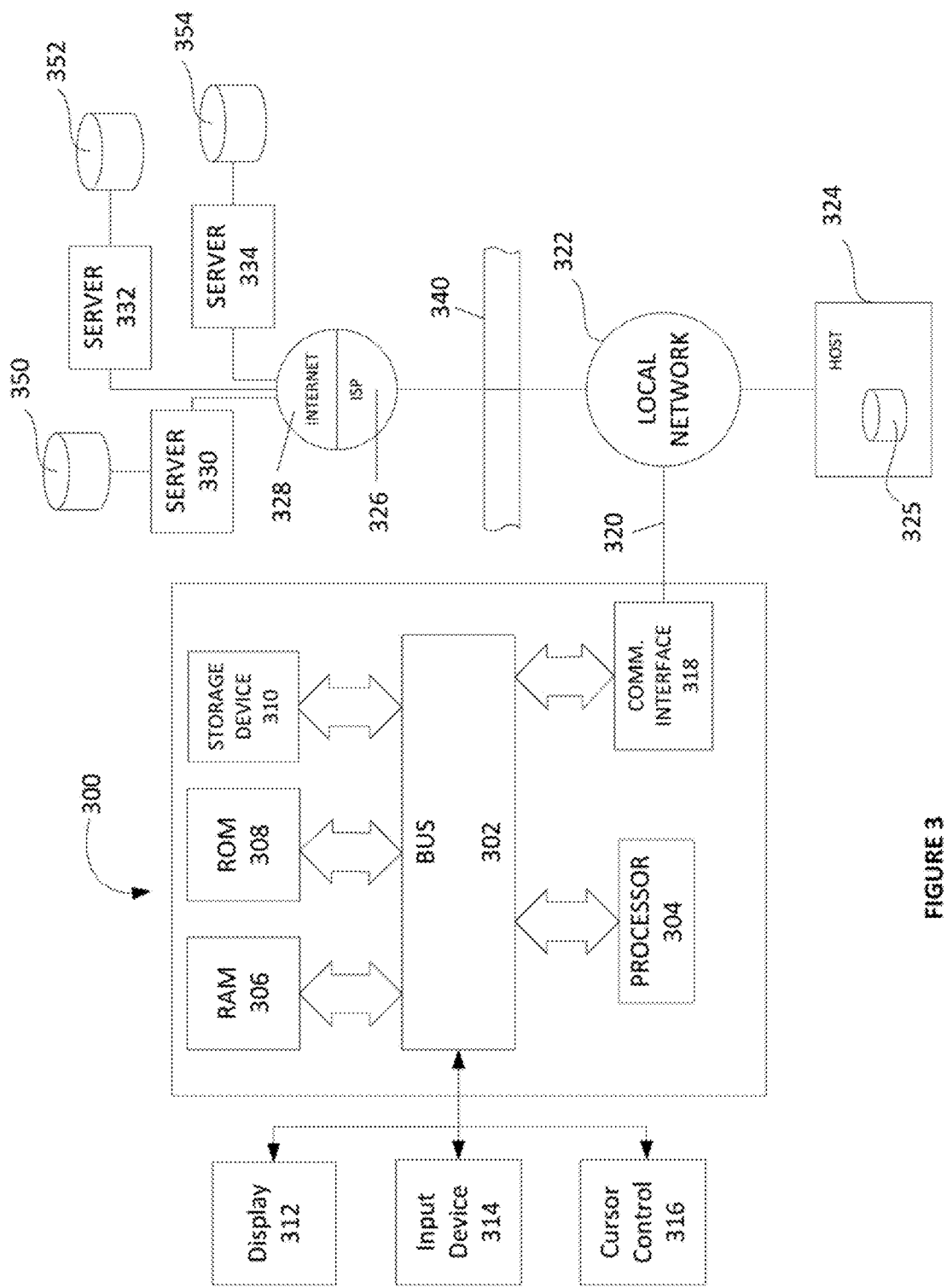
FIG. 3 is a block diagram that illustrates a platoon control computer system suitable for executing embodiments of one or more software systems or modules that perform ACC control management and methods according to the example embodiment.

FIG. 3 is a block diagram that illustrates an example embodiment of a traffic-sensitive platooning control computer system 300 of the electronic control system 12 suitable for executing embodiments of one or more software systems or modules that perform ACC control management and methods according to the example embodiment. The example computer system 300 includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. The memory may store information for effecting the platoon ACC support functionality using traffic information shared between the platooning vehicles such as for example system control logic that is executable by the processor 304 for supporting the platoon ACC between the platooning vehicle and a set of one or more other vehicle(s) travelling as the platoon (P) along the associated roadway. A storage device 310 is also suitably provided for storing information, executable instructions, other logic, and the like.

The example embodiments described herein are related to the use of the computer system 300 for determining traffic condition information and sharing the information with other platooning vehicles to adjust one or more operating conditions or parameters of ACC control of the platoon to ensure that the platooning vehicles remain spaced apart by a safe distance that is adjustable based on the shared traffic condition information. The traffic condition information may be used directly by the vehicle that determines the conditions for adjusting its own operating conditions and/or adjusting its own parameters of AEB control of the platoon. The traffic condition information may additionally be shared with the other platooning vehicles to enable those other platooning vehicles adjust one or more operating conditions or parameters of AEB control of the platoon to ensure that the platooning vehicles can adapt their braking actions to safely reduce their respective speeds that is adjustable based on the shared traffic condition information.

The computer system may further be used for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. The term "logic" as used herein does not embrace transitory signals.

The platooning control computer system 300 includes a communication interface 318 coupled with the bus 302. The communication interface 318 provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the traffic-sensitive platooning control computer system 300, are exemplary forms of carrier waves transporting the information.

The computer system 300 can send messages and receive data, including program code, through the network(s), network link 320 and communication interface 318. In the Internet-connected example embodiment, the computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The traffic-sensitive platooning control computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although traffic-sensitive platooning control computer system 300 is shown in FIG. 3 as being connectable to a set of three (3) servers, 330, 332, and 334, those skilled in the art will recognize that system 300 may establish connections to multiple additional servers on Internet 328. Each such server in the example embodiments includes HTTP-based Internet applications, which may provide information to computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platooning control computer system 300 suitably includes several subsystems or modules to perform the platoon control and management for supporting ACC between the platooning vehicles to account for non-platooning vehicle traffic as set forth herein. A primary purpose of the subject application is to provide platoon control and management for arranging two or more vehicles cooperatively travelling as a platoon along an associated roadway into a platoon arrangement, to control the gap distances therebetween, in accordance with their relative braking capabilities and other brake-related performance characteristics and based on traffic information that is obtained and shared between platooning vehicles to support ACC.

Figure 4:
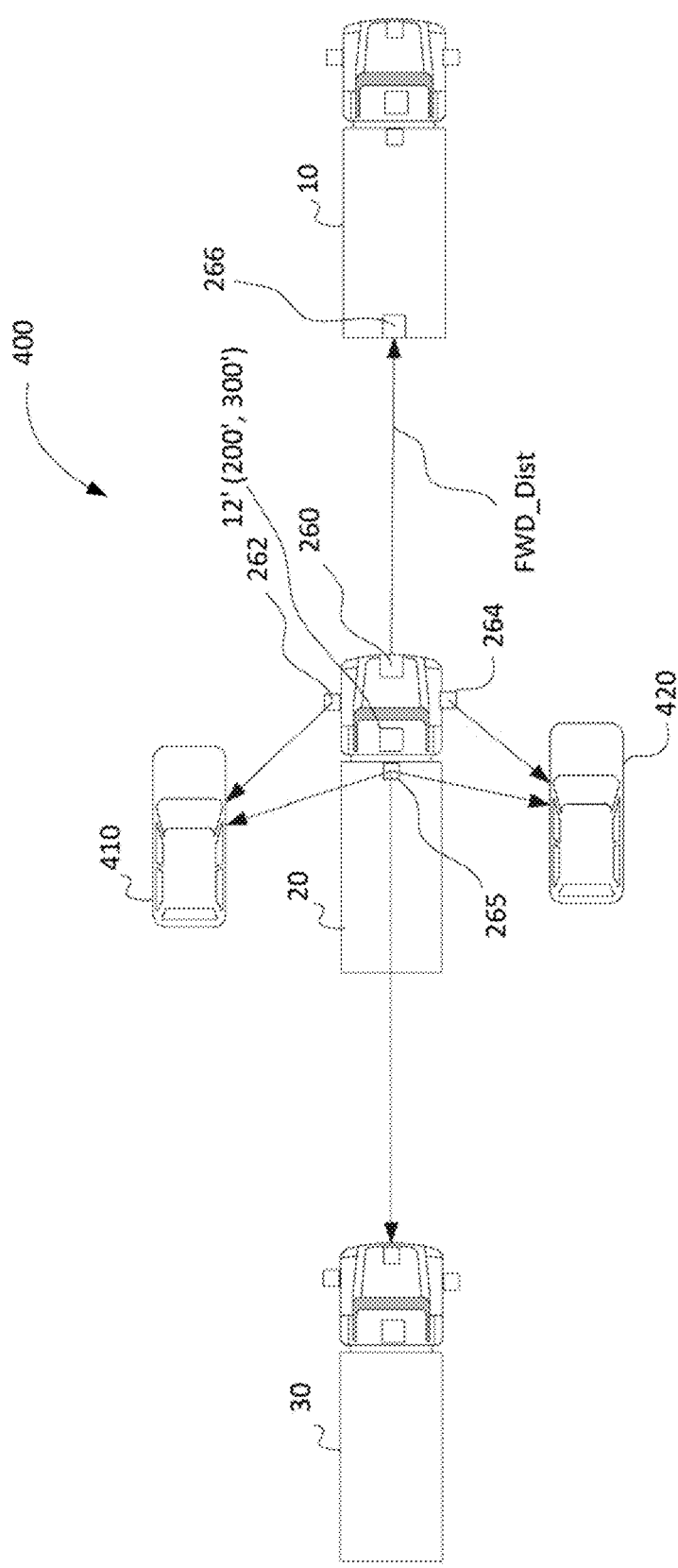
FIG. 4 is a schematic depiction of a set of signals used by an example following platoon vehicle to determine platooning vehicle traffic information and non-platooning vehicle traffic information for performing ACC control management and methods according to the example embodiment.

FIG. 4 is a schematic depiction of a set of signals used by an example following platoon vehicle to determine platooning vehicle traffic information and non-platooning vehicle traffic information for performing ACC control management and methods according to the example embodiment. The platoon P includes a forward lead vehicle 10, an intermediary following vehicle 20, and a rearward trailing vehicle 30 travelling together in a roadway scenario 400 including a first non-platooning vehicle 410 and a second non-platooning vehicle 420. It is to be appreciated that each of the lead, following, and trailing vehicles 10, 20, 30 are equivalently equipped in accordance with the example embodiment, only the intermediate following vehicle 20 will be discussed for ease of description. In the roadway scenario 400 as shown, the first non-platooning vehicle 410 is to the left of the following vehicle 20, and the second non-platooning vehicle 420 is to the right of the following vehicle 20. In accordance with the example embodiments herein each of the vehicles is equipped with a sensor unit 214 (FIG. 2) operatively coupled with the platoon control unit 230, 300, wherein the sensor unit includes several various sensors operable to sense, among other things, a presence, location, speed, and other parameters of one or more extra-platoon traffic vehicles 410, 420 relative to the platooning vehicle 10, 20, 30, and to selectively generate extra-platoon traffic vehicle data representative of the parameters of the one or more extra-platoon traffic vehicles being sensed by the sensor unit. In addition in accordance with the example embodiments herein each of the vehicles is further equipped with a communication transmitter 250 operatively coupled with the platoon control unit 230, 300 as described in connection with FIG. 2, wherein the communication transmitter is operable to receive, from the platoon control unit, the extra-platoon traffic vehicle data, convert the extra-platoon traffic vehicle data into an extra-platoon traffic vehicle signal, and transmit the extra-platoon traffic vehicle signal from the platooning vehicle 20 to the set of other platooning vehicles 10, 30.

With continued reference to FIG. 4, the sensor unit 214 disposed on the following vehicle 20 includes a forward distance sensor 260 located at a forward-directed end/side of the platooning vehicle 20. The forward distance sensor 260 is operatively coupled with the platoon control unit 300 of the following vehicle 20 and is configured to sense a presence of a (platooning) vehicle 10 forward of the following (platooning) vehicle 20, determine a forward distance FWD_Dist between the platooning vehicle 20 and the sensed forward vehicle 10, and generate a forward distance signal FWD_Dist_Sig representative of the determined forward distance FWD_Dist between the platooning vehicle 20 and the sensed forward vehicle 10.

In accordance with the example embodiment, the sensor unit 214 disposed on the following vehicle 20 further includes a left side sensor 262 disposed on a left lateral side of the platooning vehicle 20. The left side sensor 262 is configured to sense a presence of one or more extra-platoon traffic vehicles 410 adjacent to a corresponding left lateral side of the platooning vehicle 20, and to selectively generate left side extra-platoon traffic vehicle data L_EP_TV_Data representative of the one or more extra-platoon traffic vehicles 410 adjacent to a corresponding left lateral side of the platooning vehicle 20 being sensed by the sensor unit 214.

Further in accordance with the example embodiment, the sensor unit 214 disposed on the following vehicle 20 further includes a right side sensor 264 disposed on a right lateral side of the platooning vehicle 20. The right side sensor 264 is configured to sense a presence of one or more extra-platoon traffic vehicles 420 adjacent to a corresponding right lateral side of the platooning vehicle 20, and to selectively generate right side extra-platoon traffic vehicle data L_EP_TV_Data representative of the one or more extra-platoon traffic vehicles 420 adjacent to a corresponding right lateral side of the platooning vehicle 20 being sensed by the sensor unit 214.

Yet still further in accordance with the example embodiment, the sensor unit 214 disposed on the following vehicle 20 further includes a Light Detection and Ranging (LIDAR) sensor 265 disposed on the platooning vehicle 20. The LIDAR sensor 265 is configured to sense a presence of one or more extra-platoon traffic vehicles 410, 420 adjacent to corresponding left and right lateral sides of the platooning vehicle 20 and front and rear areas of the platooning vehicle 20. The LIDAR sensor 265 selectively generates left side extra-platoon traffic vehicle data representative of the one or more extra-platoon traffic vehicles 410 adjacent to a corresponding left lateral side of the platooning vehicle 20, right side extra-platoon traffic vehicle data representative of the one or more extra-platoon traffic vehicles 420 adjacent to a corresponding right lateral side of the platooning vehicle 20, front extra-platoon traffic vehicle data representative of one or more extra-platoon traffic vehicles adjacent to a forward area of the platooning vehicle 20, and rear extra-platoon traffic vehicle data representative of one or more extra-platoon traffic vehicles adjacent to a rearward area of the platooning vehicle 20.

The following vehicle 210 further includes a speed sensor 216 operatively coupled with the platoon control unit 200, 300. The speed sensor 216 is operable to determine a velocity of the platooning vehicle 20, and to generate a speed signal Speed_Sig representative of the determined velocity of the platooning vehicle. The control logic 241 of the following vehicle 210 further includes adaptive cruise control (ACC) logic stored in the non-transient memory device 240. The ACC logic is executable by the processor 230, 304 to determine, in accordance with the speed signal Speed_Sig, the forward distance signal FWD_Dist_Sig, and the extra-platoon traffic vehicle data EP_TV_Data, a nominal platooning following distance NOM_Follow_Dist or a de-rated nominal platooning following distance Derate_NOM_Follow_Dist. In accordance with the example embodiment, the nominal platooning following distance NOM_Follow_Dist is determined in accordance with the extra-platoon traffic vehicle data EP_TV_Data being representative of no extra-platoon traffic vehicles (TVs) being sensed by the sensor unit 214. Further in accordance with the example embodiment, the de-rated nominal platooning following distance Derate_NOM_Follow_Dist is determined in accordance with the extra-platoon traffic vehicle data EP_TV_Data being representative of one or more extra-platoon traffic vehicles (TVs) being sensed by the sensor unit 214. In the example embodiment, the de-rated nominal platooning following distance Derate_NOM_Follow_Dist is less than the nominal platooning following distance NOM_Follow_Dist in a predetermined proportion based on a level of the extra-platoon traffic vehicles (TVs) in accordance with the extra-platoon traffic vehicle data EP_TV_Data.

The example embodiments described herein are related to the use of the computer system 300 for determining traffic condition information and sharing the information with other platooning vehicles to adjust one or more operating conditions or parameters of ACC control of the platoon to ensure that the platooning vehicles remain spaced apart by a safe distance that is adjustable based on the shared traffic condition information. The traffic condition information may be additionally be shared with the other platooning vehicles to adjust one or more operating conditions or parameters of AEB control of the platoon to ensure that the platooning vehicles can adapt their braking actions to safely reduce their respective speeds that is adjustable based on the shared traffic condition information. In this regard, the platooning control unit 300 of the example embodiment operates to communicate the nominal platooning following distance NOM_Follow_Dist or the de-rated nominal platooning following distance Derate_NOM_Follow_Dist to an associated electronic control unit (ECU) of the platooning vehicle 20 for controlling a following distance from the platooning vehicle 20 to a vehicle of the set of at least one other associated platooning vehicle 10 ahead of the associated platooning vehicle 20.

In addition to the above, the left and right side sensors 262, 264 may detect non-platooning vehicles 410, 420 to the left and right sides of the following platooning vehicle 20. Here, the communication transmitter 250 is operable to receive, from the platooning control unit 300, the left side extra-platoon traffic vehicle data L_EP_TV_Data and the right side extra-platoon traffic vehicle data R_EP_TV_Data, convert the left side extra-platoon traffic vehicle data L_EP_TV_Data into a left side extra-platoon traffic vehicle signal L_EP_TV_Sig, convert the right side extra-platoon traffic vehicle data R_EP_TV_Data into a right side extra-platoon traffic vehicle signal R_EP_TV_Sig, and transmit the left and right side extra-platoon traffic vehicle signals L_EP_TV_Sig, R_EP_TV_Sig from the following vehicle 20 to the set of other platooning vehicles 10, 20 travelling cooperatively as the platoon P.

Still yet in addition to the above, the LIDAR sensor 265 may sense the presence of the one or more extra-platoon traffic vehicles 410, 420 adjacent to corresponding left and right lateral sides of the platooning vehicle 20 and front and rear areas of the platooning vehicle 20. In accordance with the example embodiment, the communication transmitter 250 (FIG. 2) is operable to receive, from the platoon control unit, the left side extra-platoon traffic vehicle data L_EP_TV_Data and the right side extra-platoon traffic vehicle data R_EP_TV_Data, convert the left side extra-platoon traffic vehicle data L_EP_TV_Data into a left side extra-platoon traffic vehicle signal L_EP_TV_Sig, convert the right side extra-platoon traffic vehicle data R_EP_TV_Data into a right side extra-platoon traffic vehicle signal R_EP_TV_Sig, and transmit the left and right side extra-platoon traffic vehicle signals L_EP_TV_Sig, R_EP_TV_Sig from the associated following vehicle 20 to the set of at least one other associated platooning vehicles 10, 30 travelling cooperatively as the platoon P. In this way, the electronic control system 12' of the vehicle including the data collection and communication module portion 200' and the platooning control portion 300' may share the obtained or otherwise learned traffic information with the other vehicles of the platoon.

Having the left and/or right side extra-platoon traffic vehicle present data L_EP_TV_P_Data, R_EP_TV_P_Data in hand, the logic 241 stored in the non-transient memory device 240 in accordance with an embodiment includes blind spot warning logic executable by the processor to determine a velocity and a position of the one or more extra-platoon traffic vehicles (TVs) adjacent to the left and/or right lateral sides of the associated platooning vehicle 20 based on the left and/or right side extra-platoon traffic vehicle present data L_EP_TV_P_Data, R_EP_TV_P_Data. The blind spot warning logic is executed by the processor to selectively generate velocity data TV_VELOCITY_Data representative of the determined velocity of the one or more extra-platoon traffic vehicles (TVs) and position data TV_POSITION_Data representative of the determined position of the one or more extra-platoon traffic vehicles (TVs). In the example embodiment, the communication transmitter 250 is operable to receive the velocity data TV_VELOCITY_Data and the position data TV_POSITION_Data from the platoon control unit, and transmit the velocity data TV_VELOCITY_Data and the position data TV_POSITION_Data from the associated following vehicle 20 to the set of other associated platooning vehicles 10, 30 travelling cooperatively as the platoon.

In accordance with the example embodiments herein, several various sensors are operable to sense, among other things, a presence, location, speed, and other parameters of one or more extra-platoon traffic vehicles 410, 420 relative to the platooning vehicle 10, 20, 30, and to selectively generate extra-platoon traffic vehicle data representative of the parameters of the one or more extra-platoon traffic vehicles being sensed by the sensor unit. In this regard and with respect to the distance parameter, the left side sensor 262 is configured to determine a left side distance L_Side_Dist between the associated platooning vehicle 20 and the sensed one or more extra-platoon traffic vehicles 410 at the left lateral side of the associated platooning vehicle 20, and selectively generate left lateral side distance data L_Side_Dist_Data representative of the determined left lateral side distance L_Side_Dist between the associated platooning vehicle 20 and the sensed one or more extra-platoon traffic vehicles 410 at the left lateral side of the associated platooning vehicle 20. Similarly, the right side sensor 264 is configured to determine a right side distance R_Side_Dist between the associated platooning vehicle 20 and the sensed one or more extra-platoon traffic vehicles 420 at the right lateral side of the associated platooning vehicle 20, and selectively generate a right lateral side distance data L_Side_Dist_Data representative of the determined right lateral side distance L_Side_Dist between the associated platooning vehicle 20 and the sensed one or more extra-platoon traffic vehicles 420 at the right lateral side of the associated platooning vehicle 20. The the communication transmitter 250 (FIG. 2) is operable to receive, from the platoon control unit, the left lateral side distance data L_Side_Dist_Data and/or the right lateral side distance data R_Side_Dist_Data, selectively convert the left lateral side distance data L_Side_Dist_Data into a left lateral side distance signal L_Side_Dist_Sig, selectively convert the right lateral side distance data R_Side_Dist_Data into a right lateral side distance signal R_Side_Dist_Sig, and transmit the left and/or right lateral side distance signals L_Side_Dist_Sig, R_Side_Dist_Sig from the associated following vehicle 20 to the set of at least one other associated platooning vehicles 10, 30 travelling cooperatively as the platoon.

With regard to the speed parameter in accordance with the example embodiments herein, the left side sensor 262 is configured to determine a left side speed L_Side_Speed between the associated platooning vehicle 20 and the sensed one or more extra-platoon traffic vehicles 410 at the left lateral side of the associated platooning vehicle 20, and selectively generate left side speed data L_Side_Speed_Data representative of the determined left side speed L_Side_Speed between the associated platooning vehicle 20 and the sensed one or more extra-platoon traffic vehicles 410 at the left lateral side of the associated platooning vehicle 20. Similarly, the right side sensor 264 is configured to determine a right side speed R_Side_Speed between the associated platooning vehicle 20 and the sensed one or more extra-platoon traffic vehicles 420 at the right lateral side of the associated platooning vehicle 20, and selectively generate right side speed data L_Side_Speed_Data representative of the determined right side speed L_Side_Speed between the associated platooning vehicle 20 and the sensed one or more extra-platoon traffic vehicles 420 at the right lateral side of the associated platooning vehicle 20. The communication transmitter 250 is operable to receive, from the platoon control unit, the left side speed data L_Side_Speed_Data and/or the right side speed data R_Side_Speed_Data, selectively convert the left side speed data L_Side_Speed_Data into a left side speed signal L_Side_Speed_Sig, selectively convert the right side speed data R_Side_Speed_Data into a right side speed signal R_Side_Speed_Sig, and transmit the left and/or right side speed signals L_Side_Speed_Sig, R_Side_Speed_Sig from the associated following vehicle 20 to the set of at least one other associated platooning vehicle 10, 30 travelling cooperatively as the platoon.

The blind spot warning logic stored in the non-transient memory device 240 is further executable by the processor 230, 304 to determine, in accordance with an example embodiment, whether the one or more extra-platoon traffic vehicles 410, 420 adjacent to the left and/or right lateral sides of the associated platooning vehicle 20 is in a blind zone of the associated platooning vehicle 20 blocked from view of a driver operating the associated platooning vehicle 20 based on one or more of the left and/or right side extra-platoon traffic vehicle present data L_EP_TV_P_Data, R_EP_TV_P_Data, the left and/or right lateral side distance data L_Side_Dist_Data, L_Side_Dist_Data, and/or the left and/or right side speed data L_Side_Speed_Data, L_Side_Speed_Data. The blind spot warning logic stored in the non-transient memory device 240 is further executable by the processor 230, 304 to selectively generate blind zone data ZONE_Data representative of the one or more extra-platoon traffic vehicles 410, 420 being in the blind zone of the associated platooning vehicle 20. The communication transmitter 250 is operable to receive, from the platoon control unit, the blind zone data ZONE_Data, and to transmit the blind zone data ZONE_Data from the associated following vehicle 20 to the set of at least one other associated platooning vehicle 10, 30 travelling cooperatively as the platoon.

Figure 5:
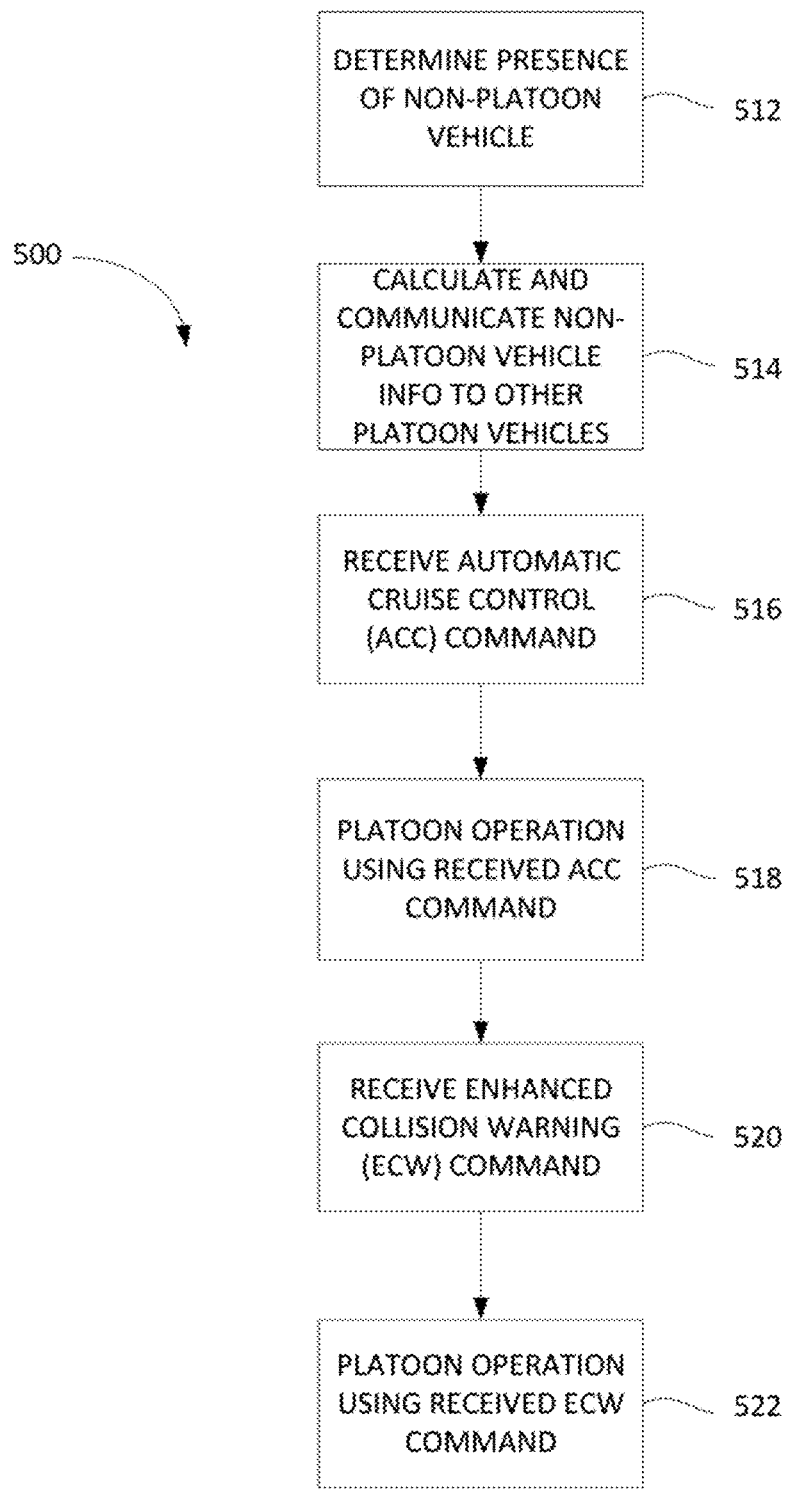
FIG. 5 is a flow diagram showing a method for ACC control management in accordance with an example embodiment.

FIG. 5 is a flow diagram showing a method 500 for ACC control management in accordance with an example embodiment. In step 512, the system may determine the presence of one or more non-platoon vehicle(s) using the techniques and sensor systems described above. In step 514, the system may calculate and communicate non-platoon vehicle information to other platoon vehicles. In step 516, the system of a first vehicle of the platoon may receive an automatic cruise control (ACC) command from a second vehicle of the platoon. In step 518, the system of the first vehicle may execute a platooning operation using ACC command received from the second other vehicle. In step 520, the system of the first platooning vehicle may receive an enhanced collision warning (ECW) command from a second vehicle of the platoon. In step 522, the system of the first platooning vehicle may execute a platooning operation using the ECW command received from the second other vehicle.

Figure 6:
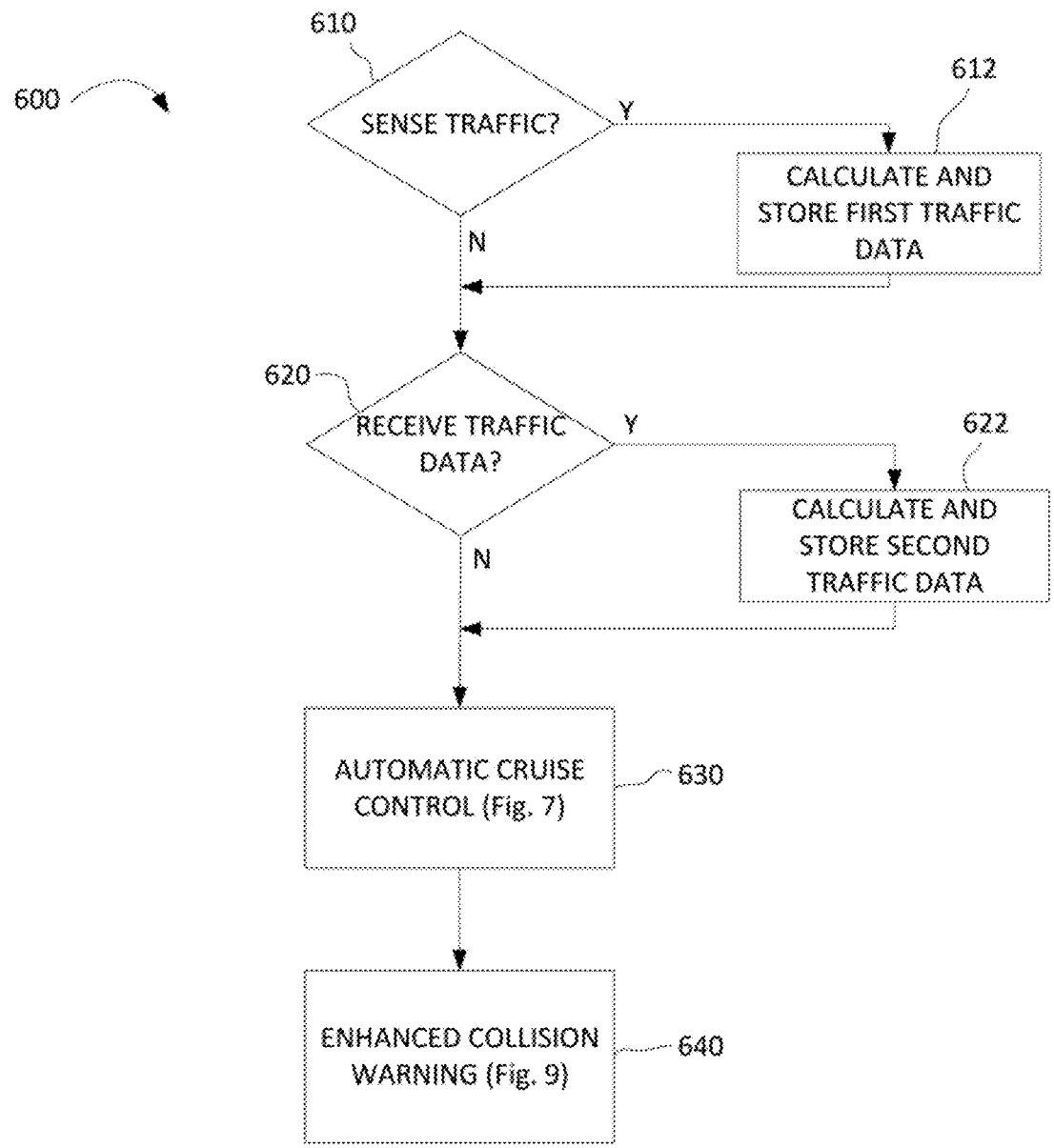
FIG. 6 is a flow diagram showing a method of sensing and receiving non-platoon traffic data and performing ACC and Enhanced Collision Warning (ECW) in accordance with an example embodiment.

FIG. 6 is a flow diagram showing a method 600 of sensing and receiving non-platoon traffic data and performing ACC and Enhanced Collision Warning (ECW) in accordance with an example embodiment. In step 610, the electronic control system 12' of the vehicle 20 including the data collection and communication module portion 200' and the platooning control portion 300' may sense non-platooning vehicle traffic in a manner described above. The electronic control system 12' of the vehicle 20 may in step 612 calculate and store first traffic data locally for purposes of operating the vehicle 20 in accordance with the obtained non-platooning vehicle traffic data. In step 620, the electronic control system 12' of the vehicle 20 may receive non-platooning vehicle traffic data from one or more of the other platooning vehicles 10, 30 in a manner described above. The electronic control system 12' of the vehicle 20 may in step 622 calculate and store the non-platooning vehicle traffic data received from the one or more other platooning vehicles 10, 30 as second traffic data locally for purposes of operating the 20 vehicle in accordance with the obtained non-platooning vehicle second traffic data. In step 630, the electronic control system 12' of the vehicle 20 including the data collection and communication module portion 200' and the platooning control portion 300' operates to perform ACC in accordance with the example embodiment and as will be described below in further detail and with reference to FIG. 7. In addition, in step 640, the electronic control system 12' of the vehicle 20 operates to perform ECW in accordance with the example embodiment and as will be described below in further detail and with reference to FIG. 9.

ACC Control

As described above, embodiments herein are directed to using shared traffic information to support cooperative coordinated platoon control operations including adaptive cruise control (ACC) operations between the platooning vehicles beneficially without the need to consult with or act under the direction of or in concert with the remote wireless communication system 50, the remote satellite system 60, the remote fleet management facility, a Network Operations Center (NOC), a Central Command Center (CCC), or the like. In this regard, the sensor unit 214 of the platoon control unit 300 of the platoon control system 12 includes a forward distance sensor 260 disposed on a forward-directed end/side of the associated platooning vehicle 20, and a speed sensor 216 In addition in the example embodiment, adaptive cruise control (ACC) logic is stored in the non-transient memory 240. In the embodiment, the forward distance sensor 260 is operable to sense a presence of an associated forward vehicle 10 forward of the associated platooning vehicle 20, determine a forward distance FWD_Dist between the associated platooning vehicle 20 and the sensed associated forward vehicle 10, and generate a forward distance signal FWD_Dist_Sig representative of the determined forward distance FWD_Dist between the associated platooning vehicle 20 and the sensed associated forward vehicle FWD_Vehicle. The speed sensor is operable to determine a velocity of the associated platooning vehicle 20, and generate a speed signal Speed_Sig representative of the determined velocity of the associated platooning vehicle 20.

The ACC logic is executable by the processor to determine, in accordance with the speed signal Speed_Sig, the forward distance signal FWD_Dist_Sig, and the extra-platoon traffic vehicle data EP_TV_Data described above either: a nominal platooning following distance NOM_Follow_Dist or a de-rated nominal platooning following distance Derate_NOM_Follow_Dist. The nominal platooning following distance NOM_Follow_Dist is determined in accordance with the extra-platoon traffic vehicle data EP_TV_Data being representative of no extra-platoon traffic vehicles 410, 420 being sensed by the sensor unit 245, and the de-rated nominal platooning following distance Derate_NOM_Follow_Dist is determined in accordance with the extra-platoon traffic vehicle data EP_TV_Data being representative of one or more extra-platoon traffic vehicles 410, 420 being sensed by the sensor unit 245, wherein the de-rated nominal platooning following distance Derate_NOM_Follow_Dist is less than the nominal platooning following distance NOM_Follow_Dist in a predetermined proportion based on a level of the extra-platoon traffic vehicles in accordance with the extra-platoon traffic vehicle data EP_TV_Data.

In the example embodiment, the platoon control unit 300 operates to communicate the nominal platooning following distance NOM_Follow_Dist or the de-rated nominal platooning following distance Derate_NOM_Follow_Dist to the associated electronic control unit ECU of the associated platooning vehicle 20 for controlling a following distance from the associated platooning vehicle 20 to a vehicle of the set of at least one other associated platooning vehicle 10 ahead of the associated platooning vehicle 20.

Figure 7:
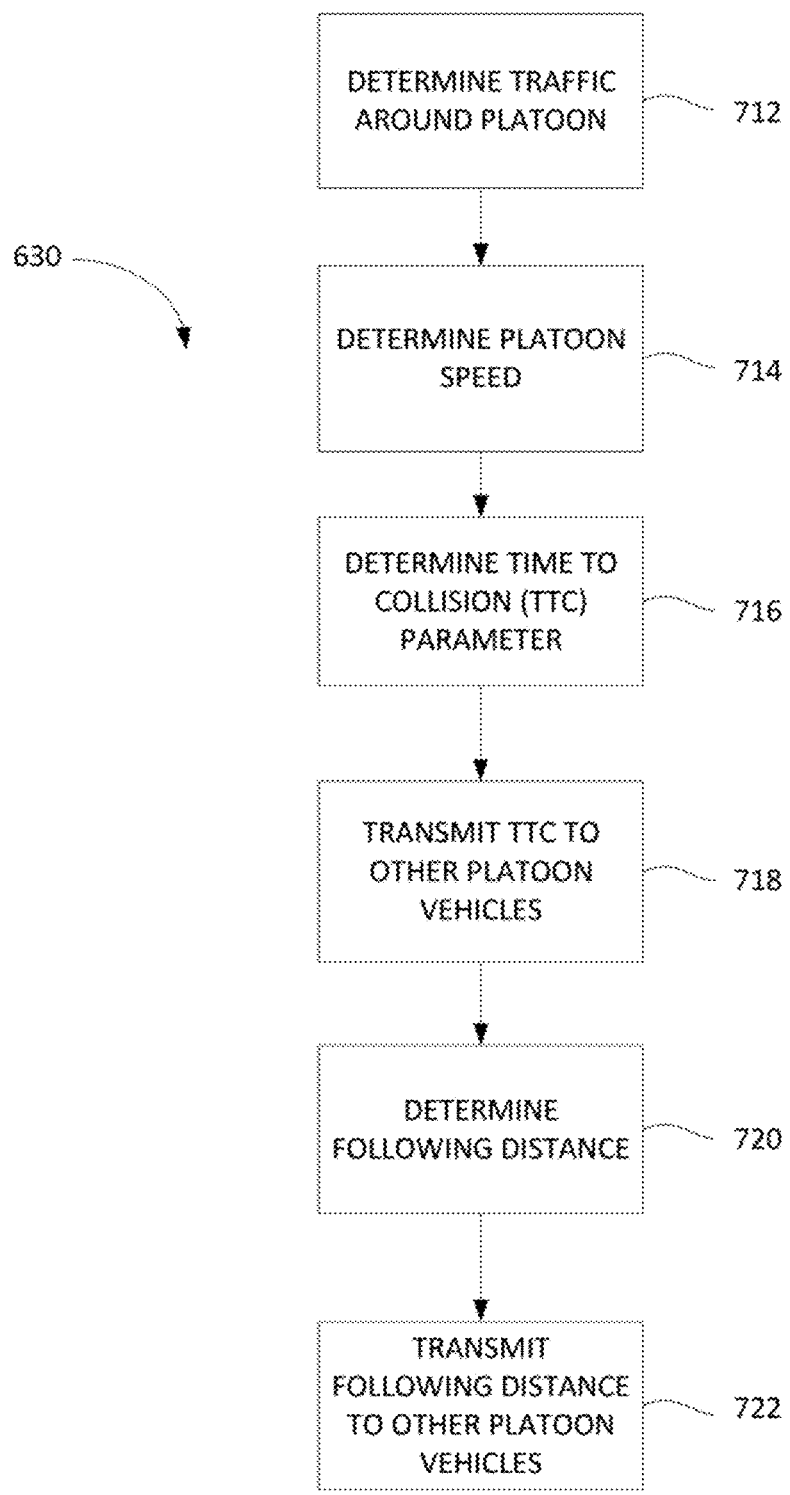
FIG. 7 is a flow diagram showing a method of sensing non-platoon traffic data and platoon speed and performing time to collision (TTC) and following distance determinations for Automatic Cruise Control (ACC) operations and transmitting the ACC determinations to other platooning vehicles in accordance with an example embodiment.
Figure 8A:
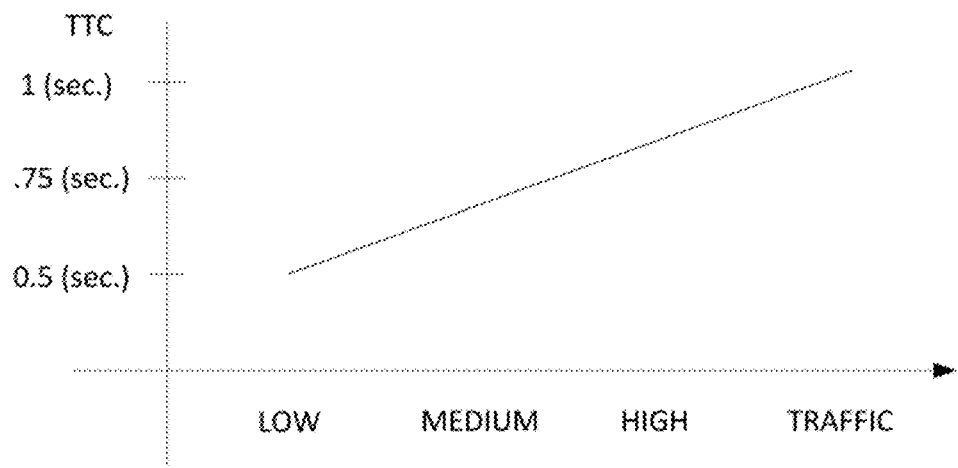
FIG. 8a is a graph showing a relationship between a level of non-platoon vehicle traffic and a TTC control setting in accordance with an example embodiment.
Figure 8B:
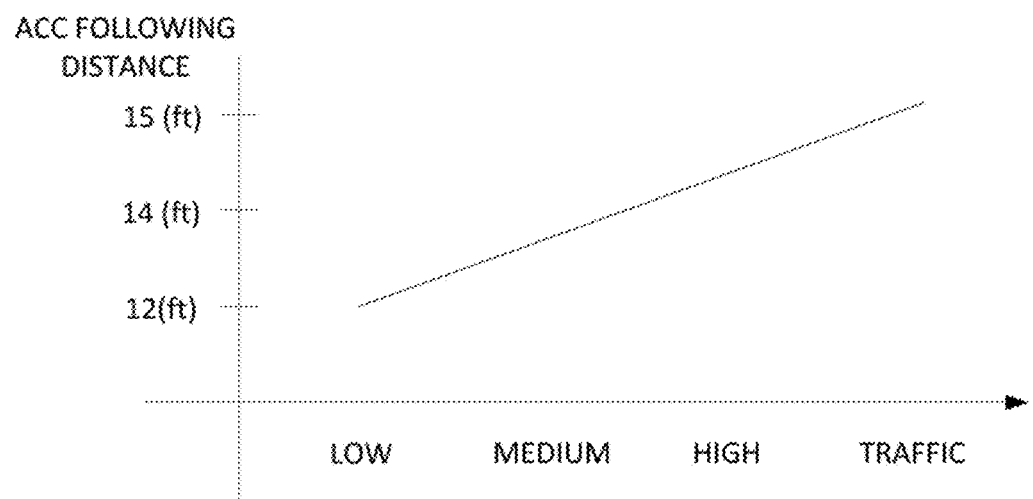
FIG. 8b is a graph showing a relationship between a level of non-platoon vehicle traffic and an ACC following distance control setting in accordance with an example embodiment.

FIG. 7 is a flow diagram showing a method 630 (FIG. 6) of sensing non-platoon traffic data and platoon speed and performing time to collision (TTC) and following distance determinations and transmitting the determinations to other platooning vehicles in accordance with an example embodiment. With reference not to that Figure together with reference to FIGS. 8*a* and 8*b*, wherein FIG. 8*a* is a graph showing a relationship between a level of non-platoon vehicle traffic and a TTC control setting in accordance with an example embodiment, and wherein FIG. 8*b* is a graph showing a relationship between a level of non-platoon vehicle traffic and an ACC following distance control setting in accordance with an example embodiment, the platooning vehicle 20 determines in step 712 non-platooning vehicle traffic conditions around the vehicle 20 by executing logic and using sensors in a manner as described above in accordance with the example embodiment. The determined non-platooning vehicle traffic conditions may include for example determining the presence of the left vehicle 410 (FIG. 4) and the right vehicle 420 (FIG. 4), for example. The traveling speed of the vehicle is determined in step 714 using, for example, the speed sensor 216 (FIG. 2).

A time to collision (TTC) parameter is determined in step 716 by the electronic control system 12' of the vehicle 20 including the data collection and communication module portion 200' and the platooning control portion 300', and is transmitted or otherwise communicated in step 718 to the other vehicles 10, 30 of the platoon using for example the transceiver 250 (FIG. 2). As can be seen in FIG. 8*a*, the TTC parameter can be increased for higher levels of non-platooning vehicle traffic and, conversely, may be decreased for lower levels of non-platooning vehicle traffic in accordance with eh example embodiments herein.

The following distance is determined in step 720 by the electronic control system 12' of the vehicle 20, and is transmitted in step 722 to the other platooning vehicles 10, 30 and is transmitted or otherwise communicated in step 722 to the other vehicles 10, 30 of the platoon using for example the transceiver 250 (FIG. 2). As can be seen in FIG. 8*b*, the ACC Following Distance parameter can be increased for higher levels of non-platooning vehicle traffic and, conversely, may be decreased for lower levels of non-platooning vehicle traffic in accordance with eh example embodiments herein.

ECW Control

Further as described above, embodiments herein are directed to using shared traffic information to support cooperative coordinated platoon control operations including autonomous emergency braking (AEB) operations between the platooning vehicles beneficially without the need to consult with or act under the direction of or in concert with the remote wireless communication system 50, the remote satellite system 60, the remote fleet management facility, a Network Operations Center (NOC), a Central Command Center (CCC), or the like. In this regard, the non-transient memory device stores autonomous emergency braking (AEB) logic, and the system includes an autonomous emergency braking output operatively coupled with the platoon control unit.

The AEB logic is executable by the processor to determine, in accordance with the forward distance signal FWD_Dist_Sig representative of the determined forward distance FWD_Dist between the associated platooning vehicle 20 and the sensed forward vehicle as described above, and the speed signal Speed_Sig representative of the determined velocity of the associated platooning vehicle 20, an autonomous emergency braking (AEB) nominal deceleration command value NOM_AEB_CMD for braking the associated vehicle 20 for avoiding a collision between the associated vehicle 20 and the associated forward vehicle. The autonomous emergency braking output is configured to receive the AEB nominal deceleration command value NOM_AEB_CMD and generate an autonomous emergency braking AEB nominal deceleration command signal NOM_AEB_Sig for use by the associated electronic control unit ECU of the associated platooning vehicle to perform an autonomous emergency braking maneuver in accordance with the AEB nominal deceleration command value NOM_AEB_CMD.

The AEB logic is configured to selectively de-rate the autonomous emergency braking (AEB) nominal deceleration command value NOM_AEB_CMD, in accordance with the extra-platoon traffic vehicle data EP_TV_Data being representative of the one or more extra-platoon traffic vehicles 410, 420 being sensed by the sensor unit, to a de-rated autonomous emergency braking (AEB) deceleration command value DeRate_AEB_CMD having a deceleration command greater than the nominal deceleration command value NOM_AEB_CMD. The communication transmitter 250 is operable to transmit the autonomous emergency braking (AEB) nominal deceleration command signal NOM_AEB_Sig from the associated following vehicle 20 to the set of at least one other associated platooning vehicle 30, 10 travelling cooperatively as the platoon.

It is to be appreciated that the other platooning vehicles may receive the signal for performing the AEB operations. To that end, a communication receiver 250 in those other platooning vehicles operatively coupled with their respective platoon control units 300 are operable to receive from the set of at least one other associated platooning vehicle 10, a platoon command de-rated AEB deceleration command signal Platoon_AEB_SIG having a deceleration command value different than the nominal deceleration command value NOM_AEB_CMD, convert the platoon command de-rated AEB deceleration command signal Platoon_AEB_SIG to platoon command de-rated AEB deceleration command data Platoon_AEB_DATA, and deliver the platoon command de-rated AEB deceleration command data Platoon_AEB_DATA to the platoon control unit 300, wherein the platoon control unit 300 operates to deliver the platoon command de-rated AEB deceleration command data Platoon_AEB_DATA to the associated electronic control unit ECU of the associated platooning vehicle for use by the associated electronic control unit ECU to perform an autonomous emergency braking maneuver in accordance with a value of the platoon command de-rated AEB deceleration command signal Platoon_AEB_SIG.

Figure 9:
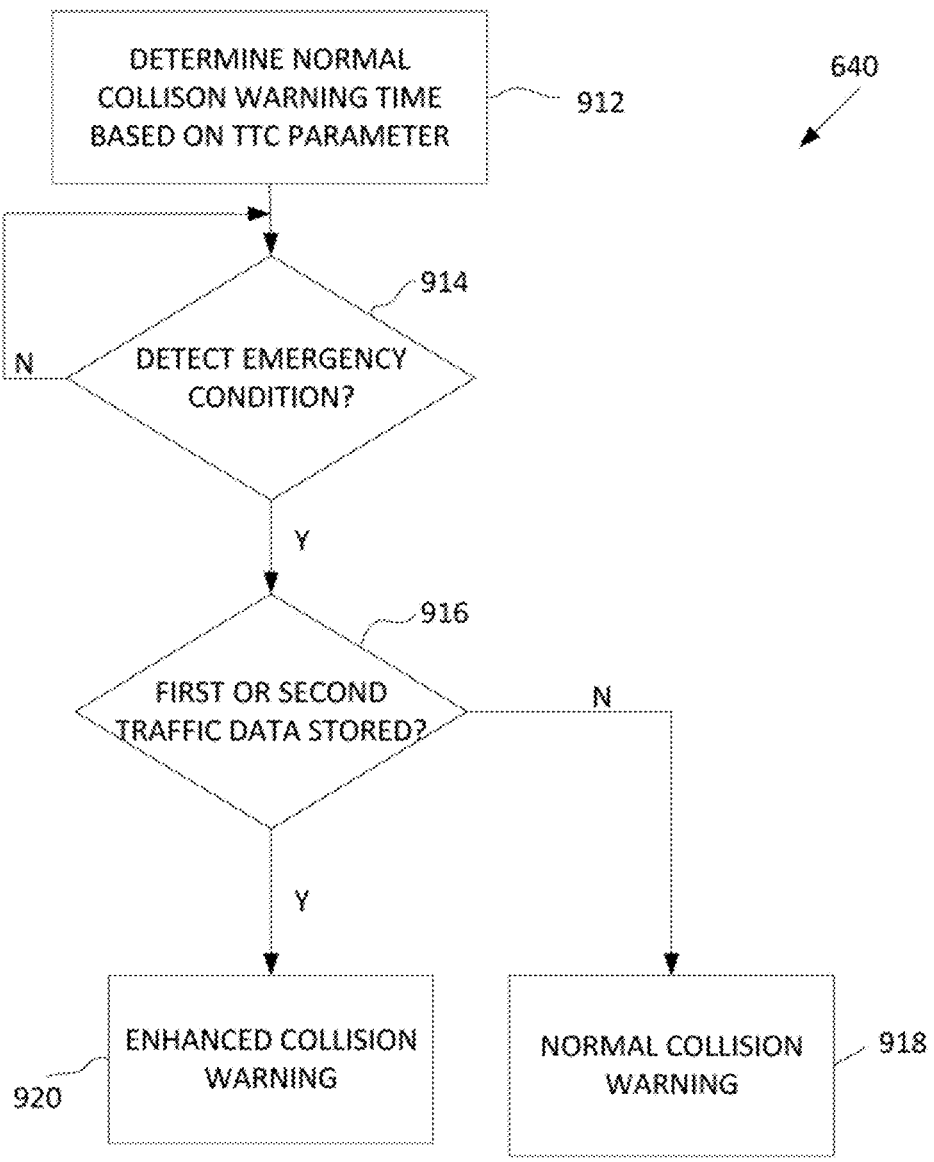
FIG. 9 is a flow diagram showing a method of providing Enhanced Collison Warning (ECW) or Normal Collision Warning in a presence of an emergency condition based on non-platoon vehicle traffic.
Figure 10A:
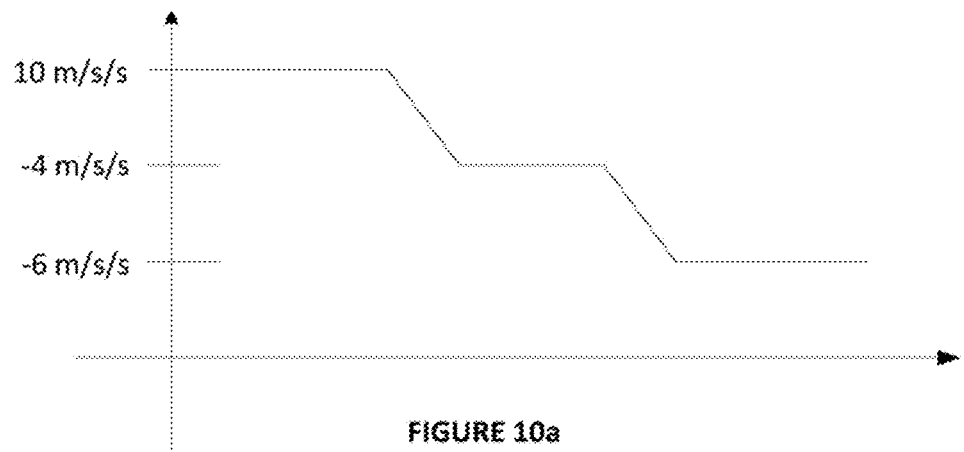
FIG. 10a is a graph showing a relationship between a level of non-platoon vehicle traffic and levels of Autonomous Emergency Braking (AEB) in accordance with the prior art.
Figure 10B:
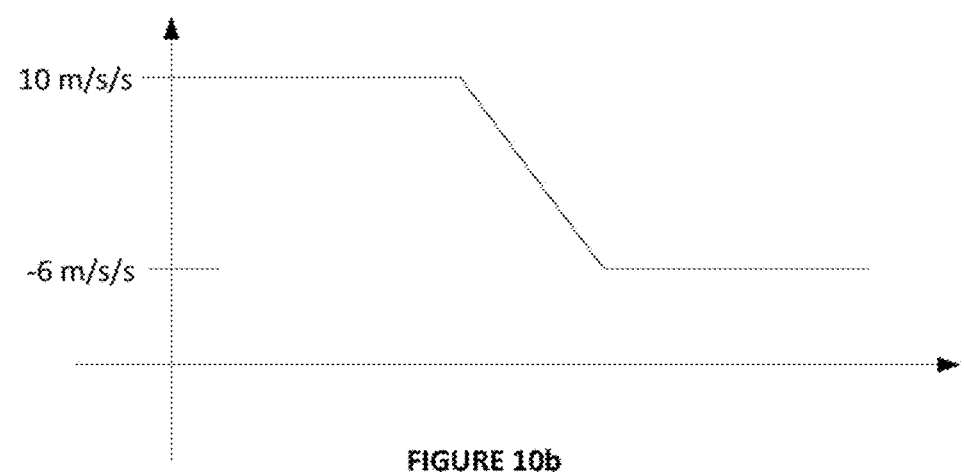
FIG. 10b is a graph showing a relationship between a level of non-platoon vehicle traffic and levels of Enhanced AEB in accordance with an example embodiment.

FIG. 9 is a flow diagram showing a method of providing Enhanced Collison Warning (ECW) or Normal Collision Warning in a presence of an emergency condition based on non-platoon vehicle traffic in accordance with an example embodiment. With reference not to that Figure together with reference to FIGS. 8a and 8b, wherein FIG. 10a is a graph showing a relationship between a level of non-platoon vehicle traffic and levels of Autonomous Emergency Braking (AEB) in accordance with the prior art, and FIG. 10b is a graph showing a relationship between a level of non-platoon vehicle traffic and levels of Enhanced AEB in accordance with an example embodiment, a time to collision (TTC) warning parameter is determined in step 716 by the electronic control system 12' of the vehicle 20 including the data collection and communication module portion 200' and the platooning control portion 300'. In the example embodiment, the TTC warning parameter is determined based on the TTC parameter described above. In step 914 the electronic control system 12' of the vehicle 20 may determine an emergency condition such as for example a condition that would require the platoon to make a sudden and rapid deceleration maneuver.

As shown in the flow diagram of FIG. 9, if no such emergency condition arises, the TTC warning parameter remains unaffected. However, if it is determined in step 914 that such a condition exists, the electronic control system 12' of the vehicle 20 determines at step 916 whether the first and/or second traffic data as described above in connection with FIG. 4, is stored. The first and second traffic data may be representative of the presence of one or more non-platooning vehicles 410, 420 near to the platoon P. In accordance with the embodiment, if an emergency condition is detected that would require a large deceleration of the platoon, and if the presence of one or more non-platooning vehicles is not detected, the electronic control system 12' executes logic that follows a normal (non-enhanced) collision warning protocol in step 918. The normal (non-enhanced) collision warning protocol is shown for example in FIG. 10a. On the other hand, if an emergency condition is detected 914 that would require a large deceleration of the platoon, and if the presence of one or more non-platooning vehicles is 916 detected, the electronic control system 12' executes logic that follows an enhanced collision warning protocol in step 920. The enhanced collision warning protocol is shown for example in FIG. 10b.

Figure 11:
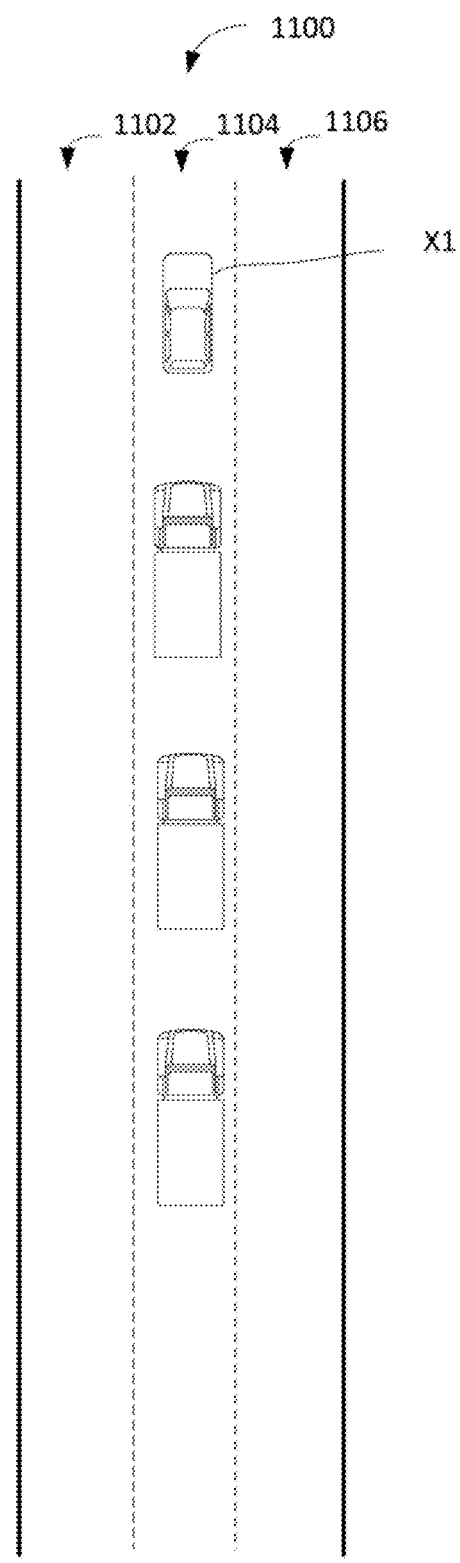
FIG. 11 is a schematic depiction of a platoon travelling in a roadway scenario performing ACC in accordance with an example embodiment.

FIG. 11 is a schematic depiction of a platoon travelling in the center lane 1104 of a three lane highway 1100 following a single non-platooning vehicle X1 and maintaining a predetermined inter-vehicle platoon following distance for ACC in accordance with an example embodiment. In this embodiment, the electronic control system 12' of the vehicle 20 determines that there are no non-platooning vehicles 410, 420 near to the platoon P. The electronic control system 12' of the vehicle 20 would therefore not need to store the first and/or second traffic data as described above in connection with FIG. 4, wherein the first and second traffic data is representative of the presence of one or more non-platooning vehicles near to the platoon P. In accordance with the embodiment, if an emergency condition is detected that would require a large deceleration of the platoon such as if the non-platooning vehicle X1 rapidly decelerates, etc., and if the presence of one or more non-platooning vehicles is not detected, the electronic control system 12' executes logic that follows a normal (non-enhanced) collision warning protocol (FIG. 9, step 918), wherein the normal (non-enhanced) collision warning protocol is shown for example in FIG. 10a.

Figure 12:
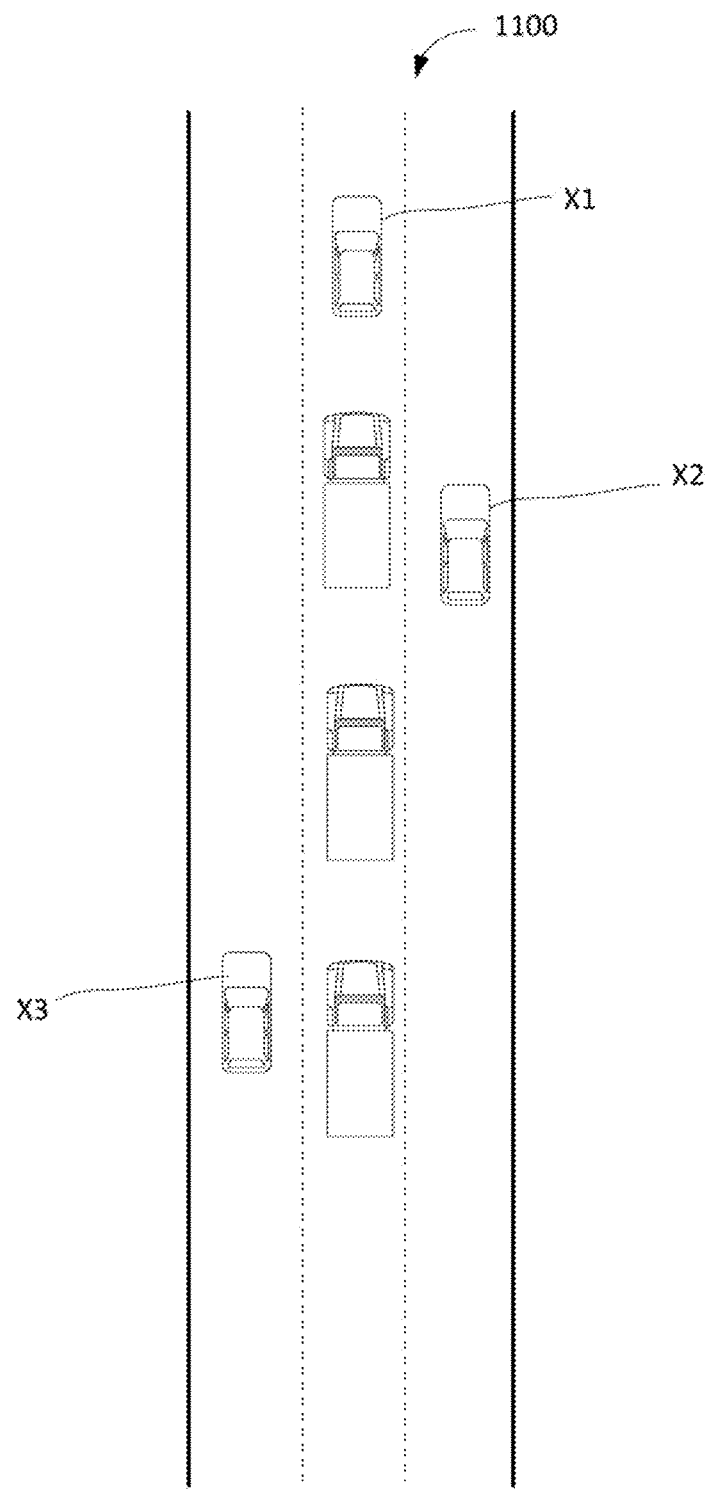
FIG. 12 is a schematic depiction of the platoon of FIG. 11 travelling in a different roadway scenario performing ACC in accordance with an example embodiment.

FIG. 12 is a schematic depiction of the platoon of FIG. 11 travelling in the center lane of the three lane highway 1100 of FIG. 11 following the single non-platooning vehicle X1 and also travelling with a small number of other non-platooning vehicles X2, X3 and maintaining a predetermined inter-vehicle platoon following distance for ACC in accordance with an example embodiment. In this embodiment, the electronic control system 12' of the vehicle 20 determines that there are non-platooning vehicles X2, X3 near to the platoon P in accordance with receiving a signal from the lead vehicle 10 indicating the presence of the non-platooning vehicles X1 and X2 and a signal from the trailing vehicle 30 indicating the presence of the non-platooning vehicle X3. The electronic control system 12' of the vehicle 20 therefore stores the first and/or second traffic data as described above in connection with FIG. 4, wherein the first and second traffic data is representative of the presence of one or more non-platooning vehicles X2, X3 near to the platoon P. In accordance with the embodiment, if an emergency condition is detected that would require a large deceleration of the platoon such as if the non-platooning vehicle X1 rapidly decelerates etc., and if the presence of the one or more non-platooning vehicles X2, X3 is detected, the electronic control system 12' executes logic that follows an enhanced collision warning protocol (FIG. 9, step 920), wherein the enhanced collision warning protocol is shown for example in FIG. 10b.

Figure 13:
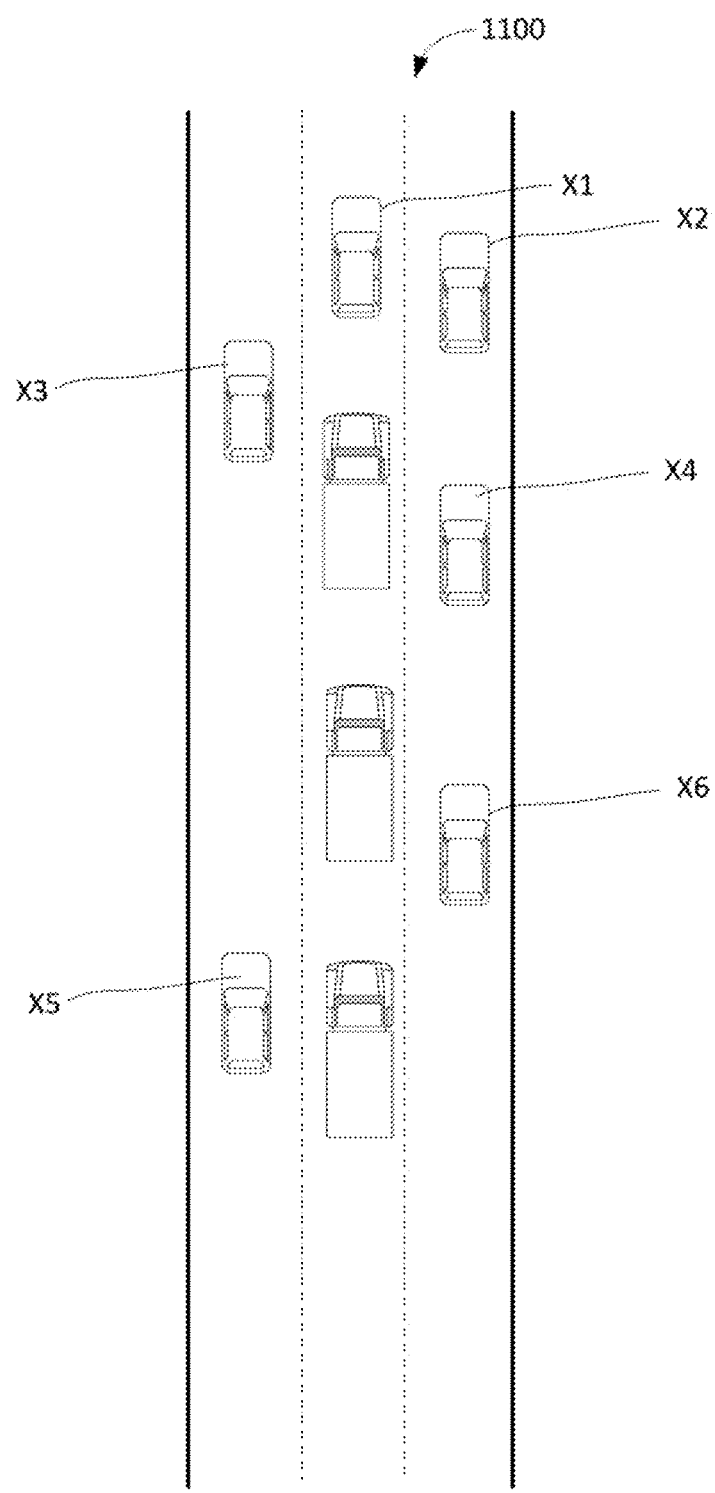
FIG. 13 is a schematic depiction of the platoon of FIG. 11 travelling in a different roadway scenario performing ACC in accordance with an example embodiment.

FIG. 13 is a schematic depiction of the platoon of FIG. 11 travelling in the center lane of the three lane highway 1100 of FIG. 11 following the single non-platooning vehicle X1 and also travelling with a large number of other non-platooning vehicles X2-X5 and maintaining a predetermined inter-vehicle platoon following distance for ACC in accordance with an example embodiment. In this embodiment, the electronic control system 12' of the vehicle 20 determines that there are non-platooning vehicles X2, X4 near to the platoon P in accordance with receiving a signal from the lead vehicle 10 indicating the presence of the non-platooning vehicles X1, X2, X3, and X4, and a signal from the trailing vehicle 30 indicating the presence of the non-platooning vehicle X5. The electronic control system 12' of the vehicle 20 therefore stores the first and/or second traffic data as described above in connection with FIG. 4, wherein the first and second traffic data is representative of the presence of one or more non-platooning vehicles X1-X5 near to the platoon P. In accordance with the embodiment, if an emergency condition is detected that would require a large deceleration of the platoon such as if the non-platooning vehicle X1 rapidly decelerates etc., and if the presence of the one or more non-platooning vehicles X1-X5 is detected, the electronic control system 12' executes logic that follows an enhanced collision warning protocol (FIG. 9, step 920), wherein the enhanced collision warning protocol is shown for example in FIG. 10b.

As described above, embodiments herein are directed to using shared traffic information to support cooperative platoon lane changing by the platooning vehicles, autonomous emergency braking (AEB) among the platooning vehicles, adaptive cruise control (ACC) between the platooning vehicles, inter-vehicle platoon distance and/or spacing management i.e. platoon ordering and spacing, and other coordinated platoon control operations beneficially without the need to consult with or act under the direction of or in concert with the remote wireless communication system 50, the remote satellite system 60, the remote fleet management facility, a Network Operations Center (NOC), a Central Command Center (CCC), or the like. In this regard, the platoon control system 12 includes a communication receiver 250 and an annunciator 312 operatively coupled with the platoon control unit 300, and cooperative platoon lane change logic stored in the non-transient memory 240. In an embodiment, the communication receiver 250 is operable to receive from a one of the set of at least one other associated platooning vehicle 10, a cooperative lane change request signal Lane_Chg_Req_Sig representative of a one of the set of at least one other associated platooning vehicle 10, 30 desirous of the platoon comprising the associated platooning vehicle 20 and the set of at least one other associated platooning vehicle 10, 30 performing a cooperative platoon lane change maneuver, and convert the cooperative lane change request signal Lane_Chg_Req_Sig to cooperative lane change request data Lane_Chg_Req_Data.

The communication receiver 250 is further operable to receive extra-platoon traffic vehicle signals EP_TV_Sigs from the set of at least one other associated platooning vehicle 10, 30 the extra-platoon traffic vehicle signals EP_TV_Sigs being representative of a presence of one or more extra-platoon traffic vehicles (TVs) being sensed near to the set of at least one other associated platooning vehicle (10), and convert the extra-platoon traffic vehicle signals EP_TV_Sigs to extra-platoon traffic vehicle data EP_TV_Data. The communication receiver 250 is further operable to deliver the cooperative lane change request data Lane_Chg_Req_Data and the extra-platoon traffic vehicle data EP_TV_Data to the platoon control unit 300.

In the example embodiment the annunciator 312 is operable to selectively generate a cooperative platoon lane change maneuver command to the operator of the associated platooning vehicle 20 for instructing the operator of the planned cooperative platoon lane change maneuver. In addition, the cooperative platoon lane change logic stored in the non-transient memory is executable by the processor responsive to receiving the cooperative lane change request data Lane_Chg_Req_Data to determine whether a cooperative platoon lane change maneuver is practical based on the extra-platoon traffic vehicle data EP_TV_Data indicating no extra-platoon traffic vehicles 410, 420 being sensed near to the set of at least one other associated platooning vehicle 10, and to cause the annunciator 312 to generate the cooperative platoon lane change maneuver command responsive to determining that the cooperative platoon lane change maneuver is practical.

Further in the example embodiment, the cooperative platoon lane change logic is executable by the processor to generate cooperative platoon lane change data responsive to determining that the cooperative platoon lane change maneuver is practical, and the communication transmitter 250 is operable to receive the cooperative platoon lane change data, convert the cooperative platoon lane change data to a cooperative platoon lane change signal, and to transmit the cooperative platoon lane change signal to the set of at least one other associated platooning vehicle 10 desirous of the platoon performing the cooperative platoon lane change maneuver.

Figure 14:
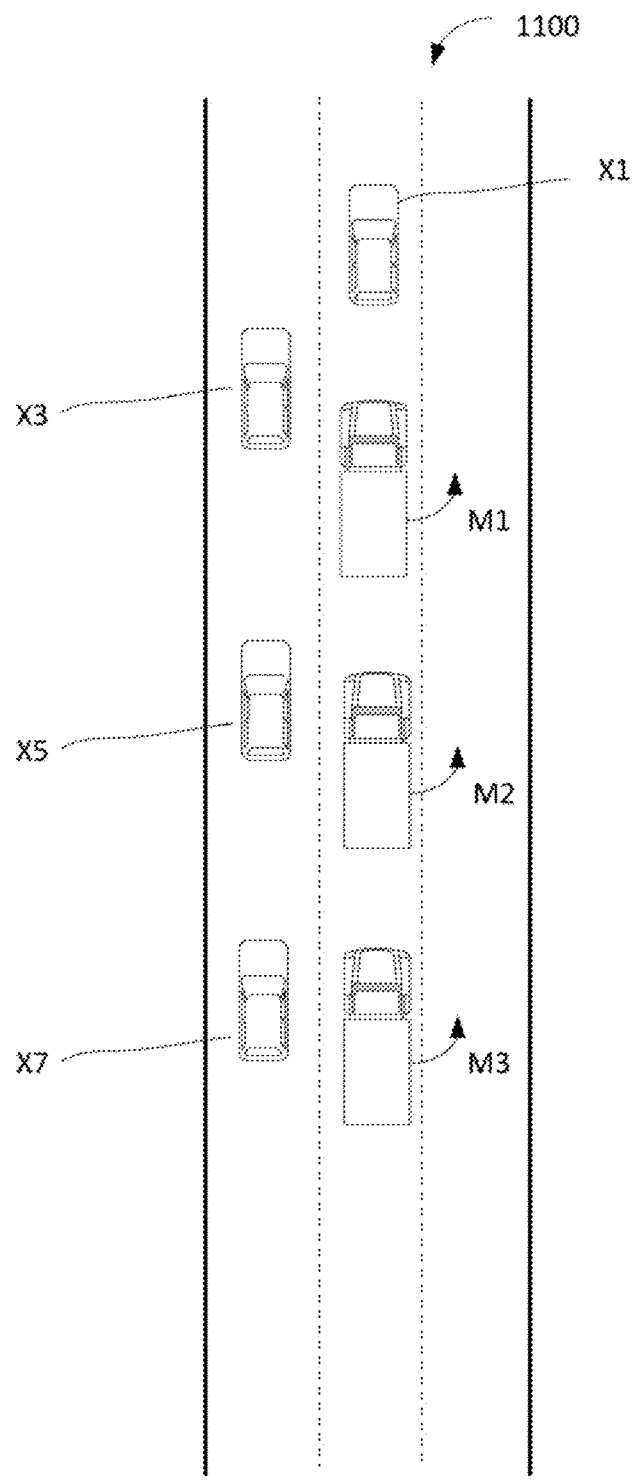
FIG. 14 is a schematic depiction of the platoon of FIG. 11 travelling in a different roadway scenario and performing a lane shift to the right maneuver in accordance with an example embodiment.

FIG. 14 is a schematic depiction of the platoon of FIG. 11 travelling in the center lane of the three lane highway 1100 of FIG. 11 following the single non-platooning vehicle X1 and also travelling with a small number of other non-platooning vehicles X3, X5, and X7 exclusively to the left of the platoon and the platoon executing a lane shift to the right maneuver in accordance with an example embodiment. In this embodiment, the electronic control system 12' of the vehicle 20 determines that there are non-platooning vehicles X3, X5, X7 near to the platoon P in accordance with receiving a signal from the lead vehicle 10 indicating the presence of the non-platooning vehicles X1 and X3, and a signal from the trailing vehicle 30 indicating the presence of the non-platooning vehicle X7. The electronic control system 12' of the vehicle 20 therefore stores the first and/or second traffic data as described above in connection with FIG. 4, wherein the first and second traffic data is representative of the presence of one or more non-platooning vehicles X1, X3, X5, and X7 near to the platoon P. In accordance with the embodiment, if an emergency condition is detected that would require a large deceleration of the platoon such as if the non-platooning vehicle X1 rapidly decelerates etc., and if the presence of the one or more non-platooning vehicles X3, X5, X7 is detected, the electronic control system 12' executes logic that follows an enhanced collision warning protocol (FIG. 9, step 920), wherein the enhanced collision warning protocol is shown for example in FIG. 10*b*. Also in accordance with the example embodiment, the platoon executes a lane shift to the right maneuver as illustrated by the curved arrows M1, M2, and M3 in order to reduce the chance of a collision with the vehicles X3, X5, X7 to the left of the platoon.

Figure 15:
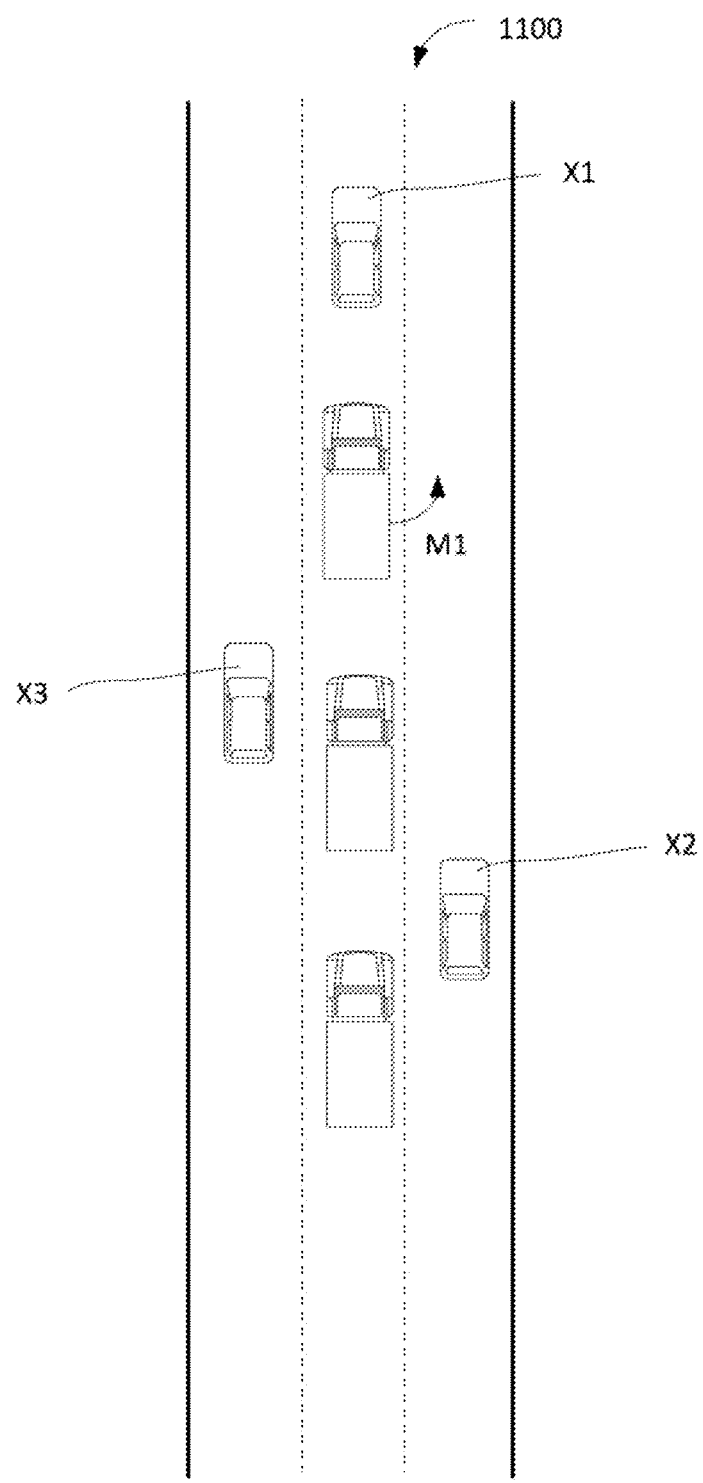
FIG. 15 is a schematic depiction of the platoon of FIG. 11 travelling in a different roadway scenario and performing a lane shift to the right maneuver without taking the remaining platooning vehicles in accordance with an example embodiment.

FIG. 15 is a schematic depiction of the platoon of FIG. 11 travelling in the center lane of the three lane highway 1100 of FIG. 11 following the single non-platooning vehicle and also travelling with a small number of other non-platooning vehicles ahead X1, to the left X3, and right X2 of the platoon and the lead vehicle of the platoon executing a lane shift to the right maneuver as illustrated by the curved arrow M1 without taking the remaining platooning vehicles in accordance with an example embodiment in order to reduce the chance of a collision with the vehicles X2, X3 to the left of the platoon. In this embodiment, the electronic control system 12' of the vehicle 20 determines that there is non-platooning vehicle X3 to the left of the vehicle 20 using its left side sensor and/or its LIDAR sensor. Similarly, the electronic control system 12" of the vehicle 30 determines that there is non-platooning vehicle X2 to the right of the vehicle 30 using its right side sensor and/or its LIDAR sensor. In accordance with the example embodiment, the lead vehicle 10 determines that there are no vehicles to its left and right using its side and Lidar sensors. In addition, the lead vehicle 10 determines that there are other non-platooning vehicles to the left X3 and to the right X2 of the platoon in general in accordance with receiving a signal from the second vehicle 20 indicating the presence of the non-platooning vehicle X3, and a signal from the trailing vehicle 30 indicating the presence of the non-platooning vehicle X2. The electronic control system 12 of the lead vehicle 10 therefore stores the first and/or second traffic data as described above in connection with FIG. 4, wherein the first and second traffic data is representative of the presence of one or more non-platooning vehicles X2, and X3 near to the platoon P. In accordance with the embodiment, if an emergency condition is detected that would require a large deceleration of the platoon such as if the non-platooning vehicle X1 rapidly decelerates etc., and if the presence of the one or more non-platooning vehicles X2, and X3 is detected, the electronic control system 12 of the lead vehicle executes logic that follows an enhanced collision warning protocol (FIG. 9, step 920), wherein the enhanced collision warning protocol is shown for example in FIG. 10*b*. Also in accordance with the example embodiment, the lead vehicle 10 of the platoon executes a lane shift to the right maneuver M1 as illustrated by the curved arrow M1 in order to reduce the chance of a collision with the vehicles X1, X2, and X3 near to the platoon.

Figure 16:
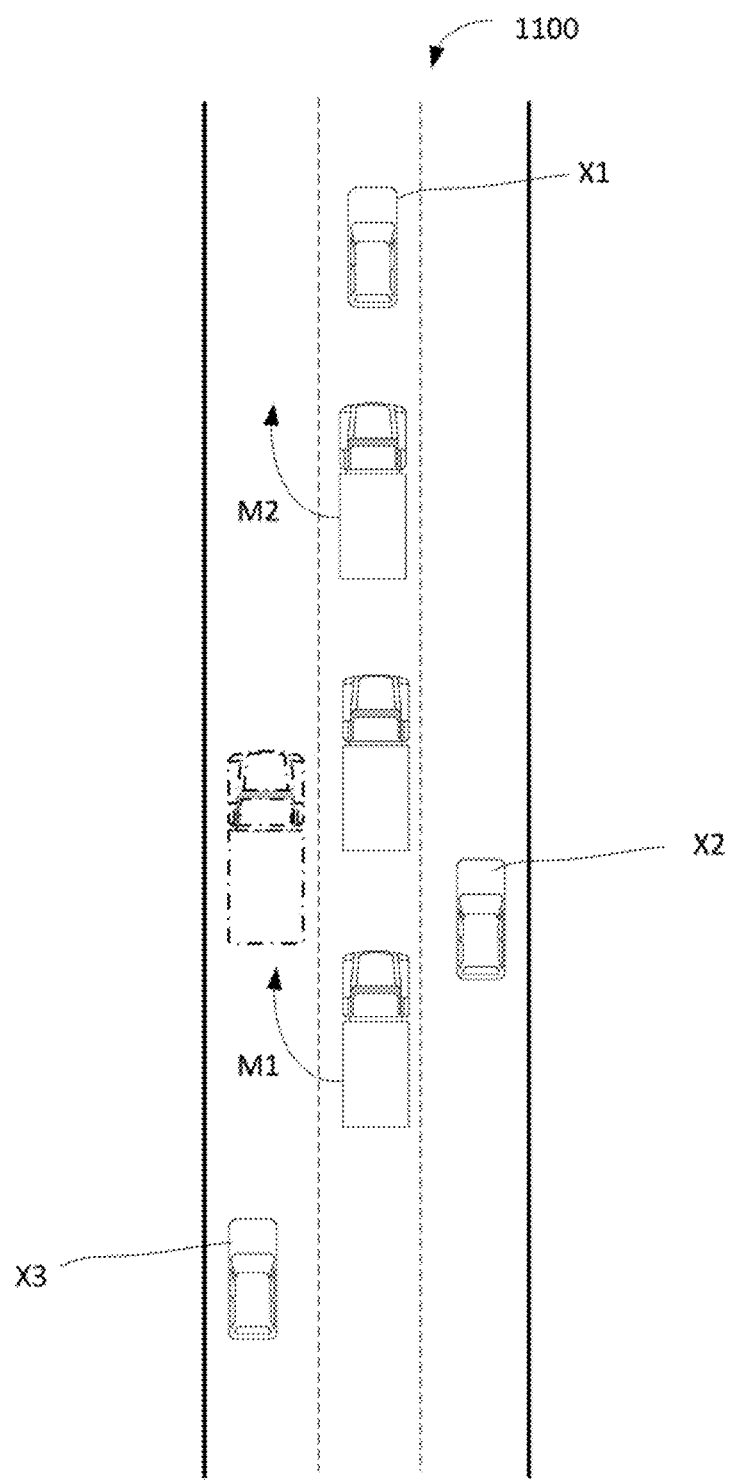
FIG. 16 is a schematic depiction of the platoon of FIG. 11 travelling in a different roadway scenario and performing a lane shift maneuver to set a block enabling the front of the platoon to thereafter lane shift left.

FIG. 16 is a schematic depiction of the platoon of FIG. 11 travelling in the center lane of the three lane highway 1100 of FIG. 11 following the single non-platooning vehicle X1 and also travelling with a small number of other non-platooning vehicles X2, X3 to the right X2 of the center of the platoon and to the left X3 of an area behind the platoon wherein the trailing vehicle 30 may execute a lane shift maneuver M1 to set a traffic block enabling the front of the platoon to thereafter lane shift left M2. In this embodiment, the electronic control system 12" of the vehicle 30 determines that there is non-platooning vehicle X2 to the right of the vehicle and a fast approaching non-platooning vehicle X3 to the left of the vehicle 30 using its left/right side sensors and/or its LIDAR sensor. The electronic control system 12 of the lead vehicle 10 determines that are no non-platooning vehicles to the right or left of the vehicle 10 using its right/left side sensors and/or its LIDAR sensor. In accordance with the example embodiment, the lead vehicle 10 determines a desire and/or need to make a lane shift maneuver. In addition, the lead vehicle 10 determines that there are other non-platooning vehicles to the left X3 and to the right X2 of the platoon in general in accordance with receiving a signal from the trailing vehicle 30 indicating the presence of the non-platooning vehicles X2, X3. The electronic control system 12 of the lead vehicle 10 transmits a signal to the trailing vehicle indicating the lane shift request, and the trailing vehicle 30 executes a lane shift left maneuver M1 in order to block the movement of the fast approaching non-platooning vehicle X3. In accordance with the example embodiment, the lead vehicle 10 of the platoon may also execute the lane shift to the right maneuver M2 as illustrated by the curved arrow M2 in order to reduce the chance of a collision with the vehicle X1 near to the platoon.

As described above and with reference next to FIG. 17, the blind spot warning logic stored in the non-transient memory device 240 is further executable by the processor 230, 304 to determine, in accordance with an example embodiment, whether the one or more extra-platoon traffic vehicles X1, X2, X3 adjacent to the left and/or right lateral sides of the associated platooning vehicle 30 is in a blind zone of the associated platooning vehicle 30 blocked from view of a driver operating the associated platooning vehicle 30 based on one or more of the left and/or right side extra-platoon traffic vehicle present data L_EP_TV_P_Data, R_EP_TV_P_Data, the left and/or right lateral side distance data L_Side_Dist_Data, L_Side_Dist_Data, and/or the left and/or right side speed data L_Side_Speed_Data, L_Side_Speed_Data. The blind spot warning logic stored in the non-transient memory device 240 is further executable by the processor 230, 304 to selectively generate blind zone data ZONE_Data representative of the one or more extra-platoon traffic vehicles X2 being in the blind zone of the associated platooning vehicle 30. The communication transmitter 250 is operable to receive, from the platoon control unit, the blind zone data ZONE_Data, and to transmit the blind zone data ZONE_Data from the associated following vehicle 30 to the set of at least one other associated platooning vehicle 20, 10 travelling cooperatively as the platoon.

Figure 17:
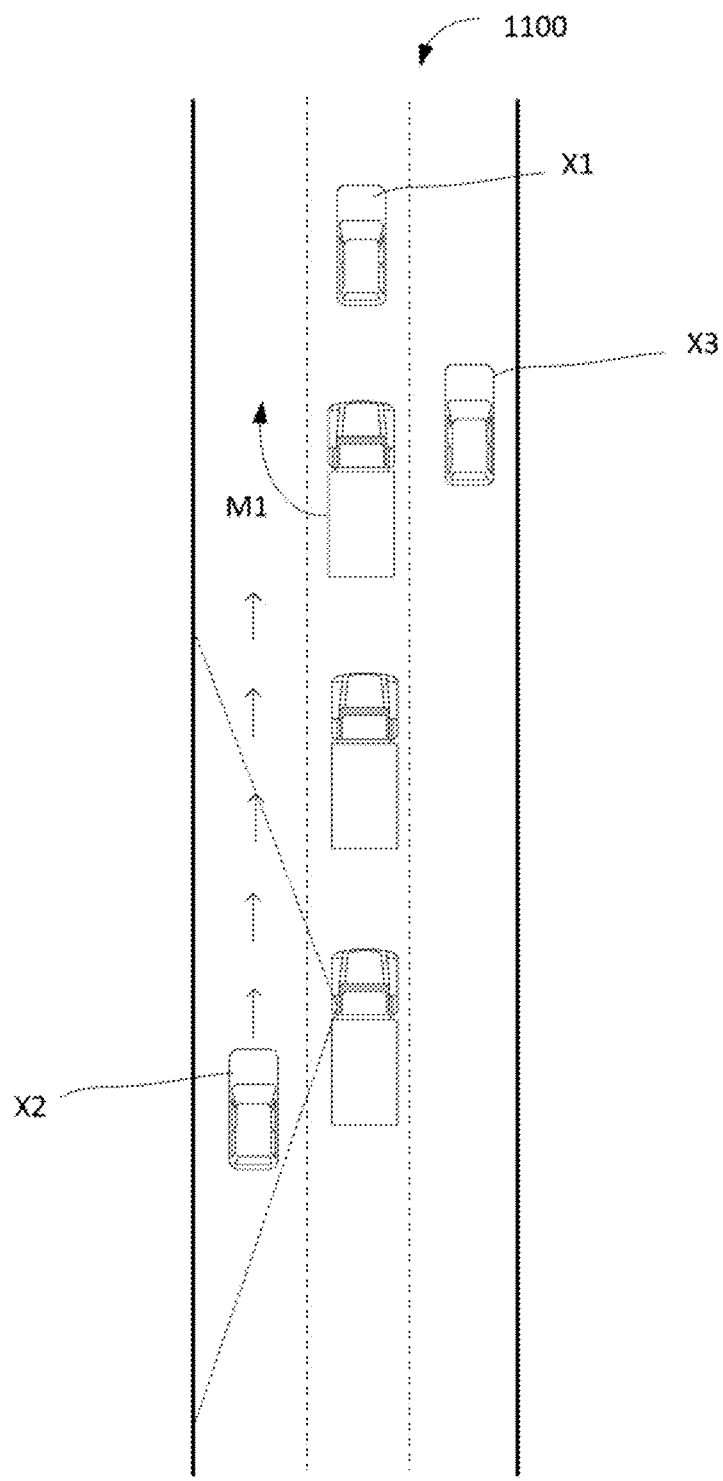
FIG. 17 is a schematic depiction of the platoon of FIG. 11 travelling in a different roadway scenario and performing a lane shift left maneuver in accordance with an example embodiment.

FIG. 17 is a schematic depiction of the platoon of FIG. 11 travelling in the center lane of the three lane highway 1100 of FIG. 11 following the single non-platooning vehicle X1 and also travelling with a small number of other non-platooning vehicles to the right of the front X3 of the platoon and to the left of the rear X2 of the platoon wherein the trailing vehicle 30 may instruct the leading platoon vehicle 10 of the approach of the oncoming traffic vehicle X2 to the left, for the leading vehicle 10 to perform a lane shift left maneuver M1 in accordance with an example embodiment. The electronic control system 12 of the lead vehicle 10 transmits a signal to the trailing vehicle indicating the lane shift request, and the trailing vehicle 30 determines the location and speed of the oncoming non-platooning vehicle X2 and transmits this information via the transceiver 250" onboard the trailing vehicle 30 to that the leading vehicle may determine whether to execute the lane shift left maneuver M1 as may be desired or as may be necessary to reduce the chance of a collision with the vehicle X1 near to the platoon.

The forward leading vehicles 20, 10 may be alerted by the trailing platooning vehicle 30 of the presence, speed, and location of the non-platooning vehicle X2. A communication receiver 250 is operatively coupled with the platoon control unit 300 of the forward leading vehicles 20, 10. The communication receiver 250 of the forward leading vehicles 20, 10 is operable to receive from a one of the set of at least one other associated platooning vehicle 30, a blind zone warning signal Blind_Zone_Warn representative of one or more extra-platoon traffic vehicles X2 being adjacent to the one of the set of at least one other associated platooning vehicle 30, to convert the blind zone warning signal Blind_Zone_Warn to blind zone warning data Blind_Zone_Data, and to deliver the blind zone warning data Blind_Zone_Data to the platoon control unit 300 of the forward leading vehicles 20, 10.

In the example embodiment, a vehicle control sensor 218, 223 is operatively coupled with the platoon control unit 300 of the forward leading vehicles 20, 10, wherein the vehicle control sensor 218, 223 is operable to sense a turning preparatory operation of the associated platooning vehicles 20, 10 by an operator of the associated platooning vehicles 20, 10, and to generate a turning intention signal Turn_Sig responsive to sensing the turning preparatory operation of the associated platooning vehicles 20, 10 by their respective operators. In addition, an annunciator 312 is operatively coupled with the platoon control unit 300 of the forward leading vehicles 20, 10, wherein the annunciator 312 is operable to selectively generate a warning to the operator of the associated platooning vehicles 20, 10 for alerting their respective operators of a potential hazard related to the turning preparatory operation.

Further in addition in the example embodiment, turn warning logic is stored in the non-transient memory of the forward leading vehicles 20, 10, the turn warning logic being executable by the processor to control the platoon control units 300 of the forward leading vehicles 20, 10 to cause their respective annunciators 312 to generate the warning responsive to the blind zone warning data Blind_Zone_Data being received from the communication receiver 250 and to the turning intention signal Turn_Sig being received by the platoon control unit (300).

Further in addition in the example embodiment, the vehicle control sensor 218, 223 includes one or more of a turn signal lever sensor 223 operatively coupled with the platoon control unit 300. The turn signal lever sensor 223 generates a turn signal lever signal representative of operation of a turn signal lever of the associated vehicle 20, 10 by the operator indicating an intention by the operator to initiate a turning operation of the associated vehicle, and/or a steering angle sensor 218 operatively coupled with the platoon control unit 300. The steering angle sensor 218 generates a steering angle signal representative of an angle of steering of front wheels of the associated vehicles 20, 10 by their respective operators. The controller 230 may generate and send a control signal to a steering wheel braking actuator 232 for adding resistance to the ability of the driver operating the vehicles 20, 10 for selectively making turning the vehicle to the left or right harder or easier in accordance with the result of operations performed by turn warning logic based on inputs indicating that traffic may be located in the direction that the driver would like to turn.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system supporting platoon control using traffic information shared between vehicles of a platoon including an associated platooning vehicle and a set of at least one other associated platooning vehicle, the system comprising:
   a platoon control unit configured to be disposed in the associated platooning vehicle, the platoon control unit being in operative communication with an electronic control unit (ECU) of the associated platooning vehicle, the platoon control unit comprising:
      a processor;
      a non-transient memory device operatively coupled with the processor; and
      logic stored in the non-transient memory and executable by the processor to support the platoon control in the associated platooning vehicle;
   a sensor unit operatively coupled with the platoon control unit, the sensor unit being operable to:
      sense a presence of one or more extra-platoon traffic vehicles relative to the associated platooning vehicle; and
      selectively generate extra-platoon traffic vehicle data representative of traffic information relating to a level of the one or more extra-platoon traffic vehicles being sensed by the sensor unit; and
   a communication transmitter operatively coupled with the platoon control unit,
   wherein the platoon control unit is operable to deliver to the ECU of the associated platooning vehicle a traffic condition signal representative of the level of the one or more extra-platoon traffic vehicles to adjust one or more operating conditions and/or parameters of the platoon control in the associated platooning vehicle,
   wherein the communication transmitter is operable to:
      receive, from the platoon control unit, the extra-platoon traffic vehicle data representative of the traffic information;
      convert the extra-platoon traffic vehicle data into an extra-platoon traffic vehicle signal; and
      transmit the extra-platoon traffic vehicle signal from the associated platooning vehicle to the set of at least one other associated platooning vehicle for use by the set of at least one other associated platooning vehicle to adjust one or more operating conditions and/or parameters of the platoon control in the at least one other associated platooning vehicle.

2. The system according to claim 1, wherein:
   the sensor unit comprises:
      a left side sensor disposed on a left lateral side of the associated platooning vehicle and operatively coupled with the platoon control unit, the left side sensor being configured to:
         sense a presence of one or more extra-platoon traffic vehicles adjacent to a corresponding left lateral side of the associated platooning vehicle; and
         selectively generate left side extra-platoon traffic vehicle present data representative of the one or more extra-platoon traffic vehicles adjacent to a corresponding left lateral side of the associated platooning vehicle being sensed by the sensor unit; and/or
      a right side sensor disposed on a right lateral side of the associated platooning vehicle and operatively coupled with the platoon control unit, the right side sensor being configured to:
         sense a presence of one or more extra-platoon traffic vehicles adjacent to a corresponding right lateral side of the associated platooning vehicle; and
         selectively generate right side extra-platoon traffic vehicle present data representative of the one or more extra-platoon traffic vehicles adjacent to a corresponding right lateral side of the associated platooning vehicle being sensed by the sensor unit; and
   the communication transmitter is operable to:
      receive, from the platoon control unit, the left side extra-platoon traffic vehicle present data and/or the right side extra-platoon traffic vehicle present data;
      selectively convert the left side extra-platoon traffic vehicle present data into a left side extra-platoon traffic vehicle present signal;
      selectively convert the right side extra-platoon traffic vehicle present data into a right side extra-platoon traffic vehicle present signal; and
      transmit the left and/or right side extra-platoon traffic vehicle present signals from the associated platooning vehicle to the set of at least one other associated platooning vehicle travelling cooperatively as the platoon.

3. The system according to claim 2, wherein:
   the left side sensor is configured to:
      determine a left side distance between the associated platooning vehicle and the sensed one or more extra-platoon traffic vehicles at the left lateral side of the associated platooning vehicle; and
      selectively generate left lateral side distance data representative of the determined left lateral side distance between the associated platooning vehicle and the sensed one or more extra-platoon traffic vehicles at the left lateral side of the associated platooning vehicle;
   the right side sensor is configured to:
      determine a right side distance between the associated platooning vehicle and the sensed one or more extra-platoon traffic vehicles at the right lateral side of the associated platooning vehicle; and
      selectively generate a right lateral side distance data representative of the determined right lateral side distance between the associated platooning vehicle and the sensed one or more extra-platoon traffic vehicles at the right lateral side of the associated platooning vehicle;
   the communication transmitter is operable to:
      receive, from the platoon control unit, the left lateral side distance data and/or the right lateral side distance data;
      selectively convert the left lateral side distance data into a left lateral side distance signal;
      selectively convert the right lateral side distance data into a right lateral side distance signal; and
      transmit the left and/or right lateral side distance signals from the associated platooning vehicle to the set of at least one other associated platooning vehicle travelling cooperatively as the platoon.

4. The system according to claim 2, wherein:
the left side sensor is configured to:
  determine a left side speed between the associated platooning vehicle and the sensed one or more extra-platoon traffic vehicles at the left lateral side of the associated platooning vehicle; and
  selectively generate left side speed data representative of the determined left side speed between the associated platooning vehicle and the sensed one or more extra-platoon traffic vehicles at the left lateral side of the associated platooning vehicle;
the right side sensor is configured to:
  determine a right side speed between the associated platooning vehicle and the sensed one or more extra-platoon traffic vehicles at the right lateral side of the associated platooning vehicle; and
  selectively generate right side speed data representative of the determined right side speed between the associated platooning vehicle and the sensed one or more extra-platoon traffic vehicles at the right lateral side of the associated platooning vehicle;
the communication transmitter is operable to:
  receive, from the platoon control unit, the left side speed data and/or the right side speed data;
  selectively convert the left side speed data into a left side speed signal;
  selectively convert the right side speed data into a right side speed signal; and
  transmit the left and/or right side speed signals from the associated platooning vehicle to the set of at least one other associated platooning vehicle travelling cooperatively as the platoon.

5. The system according to claim 2, wherein:
the left side sensor is configured to:
  determine a left side distance between the associated platooning vehicle and the sensed one or more extra-platoon traffic vehicles at the left lateral side of the associated platooning vehicle;
  determine a left side speed between the associated platooning vehicle and the sensed one or more extra-platoon traffic vehicles at the left lateral side of the associated platooning vehicle;
  selectively generate left lateral side distance data representative of the determined left lateral side distance between the associated platooning vehicle and the sensed one or more extra-platoon traffic vehicles at the left lateral side of the associated platooning vehicle; and
  selectively generate left side speed data representative of the determined left side speed between the associated platooning vehicle and the sensed one or more extra-platoon traffic vehicles at the left lateral side of the associated platooning vehicle;
the right side sensor is configured to:
  determine a right side distance between the associated platooning vehicle and the sensed one or more extra-platoon traffic vehicles at the right lateral side of the associated platooning vehicle;
  determine a right side speed between the associated platooning vehicle and the sensed one or more extra-platoon traffic vehicles at the right lateral side of the associated platooning vehicle;
  selectively generate right lateral side distance data representative of the determined right lateral side distance between the associated platooning vehicle and the sensed one or more extra-platoon traffic vehicles at the right lateral side of the associated platooning vehicle; and
  selectively generate right side speed data representative of the determined right side speed between the associated platooning vehicle and the sensed one or more extra-platoon traffic vehicles at the right lateral side of the associated platooning vehicle;
the logic stored in the non-transient memory comprises blind spot warning logic executable by the processor to determine whether the one or more extra-platoon traffic vehicles adjacent to the left and/or right lateral sides of the associated platooning vehicle is in a blind zone of the associated platooning vehicle blocked from view of a driver operating the associated platooning vehicle based on the left and/or right side extra-platoon traffic vehicle present data, the left and/or right lateral side distance data, and/or the left and/or right side speed data, and to selectively generate blind zone data representative of the one or more extra-platoon traffic vehicles being in the blind zone of the associated platooning vehicle; and
the communication transmitter is operable to:
  receive, from the platoon control unit, the blind zone data; and
  transmit the blind zone data from the associated platooning vehicle to the set of at least one other associated platooning vehicle travelling cooperatively as the platoon.

6. The system according to claim 2, wherein:
the logic stored in the non-transient memory comprises blind spot warning logic executable by the processor to determine a velocity and a position of the one or more extra-platoon traffic vehicles adjacent to the left and/or right lateral sides of the associated platooning vehicle based on the left and/or right side extra-platoon traffic vehicle present data, and to selectively generate velocity data representative of the determined velocity of the one or more extra-platoon traffic vehicles and position data representative of the determined position of the one or more extra-platoon traffic vehicles; and
the communication transmitter is operable to:
  receive, from the platoon control unit, the velocity data and the position data; and
  transmit the velocity data and the position data from the associated platooning vehicle to the set of at least one other associated platooning vehicle travelling cooperatively as the platoon.

7. The system according to claim 1, wherein:
the sensor unit comprises:
  a left side sensor disposed on a left lateral side of the associated platooning vehicle and operatively coupled with the platoon control unit, the left side sensor being configured to:
    sense a presence of one or more extra-platoon traffic vehicles adjacent to a corresponding left lateral side of the associated platooning vehicle; and
    selectively generate left side extra-platoon traffic vehicle present data representative of the one or more extra-platoon traffic vehicles adjacent to a corresponding left lateral side of the associated platooning vehicle being sensed by the sensor unit; and/or
  a right side sensor disposed on a right lateral side of the associated platooning vehicle and operatively coupled with the platoon control unit, the right side sensor being configured to:

sense a presence of one or more extra-platoon traffic vehicles adjacent to a corresponding right lateral side of the associated platooning vehicle; and selectively generate right side extra-platoon traffic vehicle present data representative of the one or more extra-platoon traffic vehicles adjacent to a corresponding right lateral side of the associated platooning vehicle being sensed by the sensor unit; and the logic stored in the non-transient memory comprises blind spot warning logic executable by the processor to determine whether the one or more extra-platoon traffic vehicles adjacent to the left and/or right lateral sides of the associated platooning vehicle is in a blind zone of the associated platooning vehicle blocked from view of a driver operating the associated platooning vehicle based on the left and/or right side extra-platoon traffic vehicle present data, and to selectively generate blind zone data representative of the one or more extra-platoon traffic vehicles being in the blind zone of the associated platooning vehicle; and the communication transmitter is operable to:
receive, from the platoon control unit, the blind zone data; and
transmit the blind zone data from the associated platooning vehicle to the set of at least one other associated platooning vehicle travelling cooperatively as the platoon.

8. The system according to claim 1, wherein the communication transmitter is operable to:
generate the extra-platoon traffic vehicle as data representative of a level of a number of the one or more extra-platoon traffic vehicles being sensed by the sensor unit.

9. The system according to claim 1:
wherein the sensor unit comprises a forward distance sensor disposed on a forward-directed end/side of the associated platooning vehicle and operatively coupled with the platoon control unit, the forward distance sensor being configured to:
sense a presence of an associated forward vehicle forward of the associated platooning vehicle;
determine a forward distance between the associated platooning vehicle and the sensed associated forward vehicle; and
generate a forward distance signal representative of the determined forward distance between the associated platooning vehicle and the sensed associated forward vehicle; and;
further comprising:
a speed sensor operatively coupled with the platoon control unit, the speed sensor being operable to determine a velocity of the associated platooning vehicle, and generate a speed signal representative of the determined velocity of the associated platooning vehicle; and
adaptive cruise control logic stored in the non-transient memory device, the adaptive cruise control logic being executable by the processor to determine, in accordance with the speed signal, the forward distance signal, and the extra-platoon traffic vehicle data:
a nominal platooning following distance in accordance with the extra-platoon traffic vehicle data being representative of no extra-platoon traffic vehicles being sensed by the sensor unit, or a de-rated nominal platooning following distance in accordance with the extra-platoon traffic vehicle data being representative of one or more extra-platoon traffic vehicles being sensed by the sensor unit, wherein the de-rated nominal platooning following distance is less than the nominal platooning following distance in a predetermined proportion based on a level of the extra-platoon traffic vehicles in accordance with the extra-platoon traffic vehicle data, wherein the platoon control unit operates to communicate the nominal platooning following distance or the de-rated nominal platooning following distance to the associated electronic control unit of the associated platooning vehicle, for controlling a following distance from the associated platooning vehicle to a vehicle of the set of at least one other associated platooning vehicle ahead of the associated platooning vehicle.

10. The system according to claim 9, further comprising:
autonomous emergency braking logic stored in the non-transient memory device, the autonomous emergency braking logic being executable by the processor to determine, in accordance with the forward distance signal representative of the determined forward distance between the associated platooning vehicle and the sensed forward vehicle, and the speed signal representative of the determined velocity of the associated platooning vehicle, an autonomous emergency braking nominal deceleration command value for braking the associated vehicle for avoiding a collision between the associated vehicle and the associated forward vehicle; and an autonomous emergency braking output operatively coupled with the platoon control unit, the autonomous emergency braking output being configured to receive the autonomous emergency braking nominal deceleration command value and generate an autonomous emergency braking nominal deceleration command signal for use by the associated electronic control unit of the associated platooning vehicle to perform an autonomous emergency braking maneuver in accordance with the autonomous emergency braking nominal deceleration command value, wherein the autonomous emergency braking logic is configured to selectively de-rate the autonomous emergency braking nominal deceleration command value, in accordance with the extra-platoon traffic vehicle data being representative of the one or more extra-platoon traffic vehicles being sensed by the sensor unit, to a de-rated autonomous emergency braking deceleration command value having a deceleration command greater than the nominal deceleration command value.

11. The system according to claim 10, wherein:
the communication transmitter is operable to transmit the autonomous emergency braking nominal deceleration command signal from the associated following vehicle to the set of at least one other associated platooning vehicle travelling cooperatively as the platoon.

12. The system according to claim 10, further comprising:
a communication receiver operatively coupled with the platoon control unit, the communication receiver being operable to:
receive from the set of at least one other associated platooning vehicle, a platoon command de-rated autonomous emergency braking deceleration command signal having a deceleration command value different than the nominal deceleration command value;
convert the platoon command de-rated autonomous emergency braking deceleration command signal to platoon command de-rated autonomous emergency braking deceleration command data; and
deliver the platoon command de-rated autonomous emergency braking deceleration command data to the platoon control unit,
wherein the platoon control unit operates to deliver the platoon command de-rated autonomous emergency braking deceleration command data to the associated electronic control unit of the associated platooning vehicle for use by the associated electronic control unit to perform an autonomous emergency braking maneuver in accordance with a value of the platoon command de-rated autonomous emergency braking deceleration command signal.

13. The system according to claim 1, further comprising:
a communication receiver operatively coupled with the platoon control unit, the communication receiver being operable to:
receive from the set of at least one other associated platooning vehicle, a platoon command de-rated platooning following distance, for controlling a following distance from the associated platooning vehicle to a vehicle of the set of at least one other associated platooning vehicle ahead of the associated platooning vehicle;
convert the platoon command de-rated platooning following distance to platoon command de-rated platooning following distance data; and
deliver the platoon command de-rated platooning following distance data to the platoon control unit,
wherein the platoon control unit operates to deliver the platoon command de-rated platooning following distance data to the associated electronic control unit of the associated platooning vehicle for use by the associated electronic control unit to control the following distance from the associated platooning vehicle to a vehicle of the set of at least one other associated platooning vehicle ahead of the associated platooning vehicle.

14. The system according to claim 1, further comprising:
a communication receiver operatively coupled with the platoon control unit, the communication receiver being operable to:
receive from a one of the set of at least one other associated platooning vehicle, a blind zone warning signal representative of one or more extra-platoon traffic vehicles being adjacent to the one of the set of at least one other associated platooning vehicle,
convert the blind zone warning signal to blind zone warning data; and
deliver the blind zone warning data to the platoon control unit,
a vehicle control sensor operatively coupled with the platoon control unit, the vehicle control sensor being operable to sense a turning preparatory operation of the associated platooning vehicle by an operator of the associated platooning vehicle, and to generate a turning intention signal responsive to sensing the turning preparatory operation of the associated platooning vehicle by the operator;
an annunciator operatively coupled with the platoon control unit, the annunciator being operable to selectively generate a warning to the operator of the associated platooning vehicle for alerting the operator of a potential hazard related to the turning preparatory operation; and
turn warning logic stored in the non-transient memory, the turn warning logic being executable by the processor to control the platoon control unit to cause the annunciator to generate the warning responsive to the blind zone warning data being received from the communication receiver and to the turning intention signal being received by the platoon control unit.

15. The system according to claim 14, wherein:
the vehicle control sensor comprises one or more of:
a turn signal lever sensor operatively coupled with the platoon control unit, the turn signal lever sensor generating a turn signal lever signal representative of operation of a turn signal lever of the associated vehicle by the operator indicating an intention by the operator to initiate a turning operation of the associated vehicle, and/or
a steering angle sensor operatively coupled with the platoon control unit, the steering angle sensor generating a steering angle signal representative of an angle of steering of front wheels of the associated vehicle by the operator.

16. The system according to claim 1, further comprising:
a communication receiver operatively coupled with the platoon control unit, the communication receiver being operable to:
receive from a one of the set of at least one other associated platooning vehicle, a cooperative lane change request signal representative of a one of the set of at least one other associated platooning vehicle desirous of the platoon comprising the associated platooning vehicle and the set of at least one other associated platooning vehicle performing a cooperative platoon lane change maneuver;
convert the cooperative lane change request signal to cooperative lane change request data;
receive extra-platoon traffic vehicle signals from the set of at least one other associated platooning vehicle, the extra-platoon traffic vehicle signals being representative of a presence of one or more extra-platoon traffic vehicles being sensed near to the set of at least one other associated platooning vehicle;
convert the extra-platoon traffic vehicle signals to extra-platoon traffic vehicle data; and
deliver the cooperative lane change request data and the extra-platoon traffic vehicle data to the platoon control unit,
an annunciator operatively coupled with the platoon control unit, the annunciator being operable to selectively generate a cooperative platoon lane change maneuver command to the operator of the associated platooning vehicle for instructing the operator of the planned cooperative platoon lane change maneuver;
cooperative platoon lane change logic stored in the non-transient memory, the cooperative platoon lane change logic being executable by the processor responsive to receiving the cooperative lane change request data to:
determine whether a cooperative platoon lane change maneuver is practical based on the extra-platoon traffic vehicle data indicating no extra-platoon traffic vehicles being sensed near to the set of at least one other associated platooning vehicle; and cause the annunciator to generate the cooperative platoon lane change maneuver command responsive to determining that the cooperative platoon lane change maneuver is practical.

17. The system according to claim 16, wherein:
the cooperative platoon lane change logic is executable by the processor to generate cooperative platoon lane change data responsive to determining that the cooperative platoon lane change maneuver is practical; and
the communication transmitter is operable to receive the cooperative platoon lane change data, convert the cooperative platoon lane change data to a cooperative platoon lane change signal, and to transmit the cooperative platoon lane change signal to the set of at least one other associated platooning vehicle desirous of the platoon performing the cooperative platoon lane change maneuver.

18. A method for supporting platoon control using traffic information shared between vehicles of a platoon including an associated platooning vehicle and a set of at least one other associated platooning vehicle, the method comprising:
providing a platoon control unit in operative communication with an associated electronic control unit (ECU) of the associated platooning vehicle, the platoon control unit comprising a processor, a non-transient memory device operatively coupled with the processor, and logic stored in the non-transient memory and executable by the processor to support the platoon control in the associated platooning vehicle;
sensing by a sensor unit operatively coupled with the platoon control unit a presence of one or more extra-platoon traffic vehicles relative to the associated platooning vehicle;
selectively generating by the sensor extra-platoon traffic vehicle data representative of traffic information relating to a level of the one or more extra-platoon traffic vehicles being sensed by the sensor unit;
delivering a traffic condition signal by the platoon control unit to the ECU of the associated vehicle for adjusting one or more operating conditions and/or parameters of the platoon control in the associated platooning vehicle, the traffic condition signal being representative of the level of the one or more extra-platoon traffic vehicles;
receiving the extra-platoon traffic vehicle data representative of the traffic information from the platoon control unit by a communication transmitter operatively coupled with the platoon control unit;
converting the extra-platoon traffic vehicle data by the communication transmitter into an extra-platoon traffic vehicle signal; and
transmitting the extra-platoon traffic vehicle signal by the communication transmitter from the associated platooning vehicle to the set of at least one other associated platooning vehicle for use by the set of at least one other associated platooning vehicle to adjust one or more operating conditions and/or parameters of the platoon control in the at least one other associated platooning vehicle.

19. The method according to claim 18 further comprising:
sensing by a forward distance sensor disposed on a forward-directed end/side of the associated platooning vehicle and operatively coupled with the platoon control unit a presence of an associated forward vehicle forward of the associated platooning vehicle;
determining by the forward distance sensor a forward distance between the associated platooning vehicle and the sensed associated forward vehicle;
generating by the forward distance sensor a forward distance signal representative of the determined forward distance between the associated platooning vehicle and the sensed associated forward vehicle;
determining by a speed sensor operatively coupled with the platoon control unit a velocity of the associated platooning vehicle, and generate a speed signal representative of the determined velocity of the associated platooning vehicle; and
executing adaptive cruise control logic stored in the non-transient memory device to determine, in accordance with the speed signal, the forward distance signal, and the extra-platoon traffic vehicle data:
a nominal platooning following distance in accordance with the extra-platoon traffic vehicle data being representative of no extra-platoon traffic vehicle being sensed by the sensor unit, or
a de-rated nominal platooning following distance in accordance with the extra-platoon traffic vehicle data being representative of one or more extra-platoon traffic vehicles being sensed by the sensor unit, wherein the de-rated nominal platooning following distance is less than the nominal platooning following distance in a predetermined proportion based on a level of the extra-platoon traffic vehicles in accordance with the extra-platoon traffic vehicle data,
wherein the platoon control unit operates to communicate the nominal platooning following distance or the de-rated nominal platooning following distance to the associated electronic control unit of the associated platooning vehicle, for controlling a following distance from the associated platooning vehicle to a vehicle of the set of at least one other associated platooning vehicle ahead of the associated platooning vehicle.

20. The method according to claim 19, further comprising:
executing autonomous emergency braking logic stored in the non-transient memory device by the processor to determine, in accordance with the forward distance signal representative of the determined forward distance between the associated platooning vehicle and the sensed forward vehicle, and the speed signal representative of the determined velocity of the associated platooning vehicle, an autonomous emergency braking nominal deceleration command value for braking the associated vehicle for avoiding a collision between the associated vehicle and the associated forward vehicle; and
receiving by an autonomous emergency braking output operatively coupled with the platoon control unit the autonomous emergency braking nominal deceleration command value and generating an autonomous emergency braking nominal deceleration command signal for use by the associated electronic control unit of the associated platooning vehicle to perform an autonomous emergency braking maneuver in accordance with the autonomous emergency braking nominal deceleration command value,
wherein the autonomous emergency braking logic is configured to selectively de-rate the autonomous emergency braking nominal deceleration command value, in accordance with the extra-platoon traffic vehicle data being representative of the one or more extra-platoon traffic vehicles being sensed by the sensor unit, to a de-rated autonomous emergency braking deceleration command value having a deceleration command greater than the nominal deceleration command value.

21. The method according to claim 20, further comprising:
- receiving by a communication receiver operatively coupled with the platoon control unit a cooperative lane change request signal representative of a one of the set of at least one other associated platooning vehicle desirous of the platoon comprising the associated platooning vehicle and the set of at least one other associated platooning vehicle performing a cooperative platoon lane change maneuver;
- converting by the communication receiver the cooperative lane change request signal to cooperative lane change request data;
- receiving by the communication receiver extra-platoon traffic vehicle signals from the set of at least one other associated platooning vehicle, the extra-platoon traffic vehicle signals being representative of a presence of one or more extra-platoon traffic vehicles being sensed near to the set of at least one other associated platooning vehicle;
- converting by the communication receiver the extra-platoon traffic vehicle signals to extra-platoon traffic vehicle data;
- delivering by the communication receiver the cooperative lane change request data and the extra-platoon traffic vehicle data to the platoon control unit;
- selectively generating by an annunciator operatively coupled with the platoon control unit a cooperative platoon lane change maneuver command to the operator of the associated platooning vehicle for instructing the operator of the planned cooperative platoon lane change maneuver; and
- executing cooperative platoon lane change logic stored in the non-transient memory by the processor responsive to receiving the cooperative lane change request data to:
  - determine whether a cooperative platoon lane change maneuver is practical based on the extra-platoon traffic vehicle data indicating no extra-platoon traffic vehicles being sensed near to the set of at least one other associated platooning vehicle; and
  - cause the annunciator to generate the cooperative platoon lane change maneuver command responsive to determining that the cooperative platoon lane change maneuver is practical.

* * * * *